US010229487B2

(12) United States Patent
Goyal et al.

(10) Patent No.: US 10,229,487 B2
(45) Date of Patent: Mar. 12, 2019

(54) OPTICAL VIBROMETRIC TESTING OF CONTAINER FOR ITEMS

(71) Applicant: Amazon Technologies, Inc., Seattle, WA (US)

(72) Inventors: Dushyant Goyal, Jersey City, NJ (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 15/443,677

(22) Filed: Feb. 27, 2017

(65) Prior Publication Data

US 2018/0247404 A1 Aug. 30, 2018

(51) Int. Cl.
| | | |
|---|---|---|
| *G06T 7/00* | (2017.01) | |
| *G06T 5/50* | (2006.01) | |
| *G06T 7/60* | (2017.01) | |
| *G06Q 10/08* | (2012.01) | |
| *G06K 9/62* | (2006.01) | |

(52) U.S. Cl.
CPC .......... *G06T 7/0008* (2013.01); *G06K 9/6202* (2013.01); *G06Q 10/087* (2013.01); *G06T 5/50* (2013.01); *G06T 7/60* (2013.01); *G06T 2207/10016* (2013.01); *G06T 2207/20221* (2013.01); *G06T 2207/30242* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,319,547 | A | * | 6/1994 | Krug | G01N 23/04 382/100 |
| 5,490,218 | A | * | 2/1996 | Krug | G01N 23/04 378/53 |
| 5,821,424 | A | * | 10/1998 | Rodriguez | G01F 23/2966 73/657 |

(Continued)

FOREIGN PATENT DOCUMENTS

WO    WO2010017533    2/2010

OTHER PUBLICATIONS

Smith, L.I., "A Tutorial on Principal components Analysis", retrieved Jan. 19, 2017, from <<http://faculty.iiit.ac.in/~mkrishna/PrincipalComponents.pdf>>, published Feb. 26, 2002, 27 pages.

(Continued)

*Primary Examiner* — Anand P Bhatnagar
(74) *Attorney, Agent, or Firm* — Lee & Hayes, P.C.

(57) ABSTRACT

Techniques for automated quality control of containers and items are disclosed. Images of a container can be successively captured over time. A consolidated image can be generated from the captured images. A non-image representation of the consolidated image can be determined. The non-image representation can be used to determine whether the container satisfies a condition. An imaging system can include a visual reference object or an object sensor used to detect entry of the container into a view volume of an electronic camera. A motion system can transport the container into the view volume. Some examples operate in an automated-warehouse environment.

20 Claims, 12 Drawing Sheets

(56) References Cited

U.S. PATENT DOCUMENTS

| | | | | |
|---|---|---|---|---|
| 7,098,784 | B2* | 8/2006 | Easley | G06Q 10/08 |
| | | | | 340/539.1 |
| 8,151,644 | B2* | 4/2012 | Brandt | G01H 9/00 |
| | | | | 73/643 |
| 8,554,639 | B2* | 10/2013 | Dollens | G06Q 30/0643 |
| | | | | 382/276 |
| 9,459,238 | B1* | 10/2016 | Konopka | G08B 13/1609 |
| 9,482,506 | B1* | 11/2016 | Wurzbach | G08B 13/1609 |
| 2003/0135097 | A1* | 7/2003 | Wiederhold | A61B 5/02055 |
| | | | | 600/301 |
| 2008/0077511 | A1 | 3/2008 | Zimmerman | |
| 2009/0226029 | A1* | 9/2009 | Shimano | G06T 5/009 |
| | | | | 382/100 |
| 2011/0193941 | A1* | 8/2011 | Inaba | G03B 35/14 |
| | | | | 348/46 |
| 2014/0052549 | A1* | 2/2014 | Dollens | G06Q 30/0643 |
| | | | | 705/14.73 |
| 2014/0052555 | A1* | 2/2014 | MacIntosh | G06Q 20/208 |
| | | | | 705/23 |
| 2014/0379588 | A1* | 12/2014 | Gates | G06Q 10/0631 |
| | | | | 705/308 |
| 2015/0010128 | A1* | 1/2015 | Drouin | G01N 23/046 |
| | | | | 378/57 |
| 2015/0052029 | A1 | 2/2015 | Wu et al. | |
| 2017/0011259 | A1* | 1/2017 | Majumdar | G06T 7/262 |
| 2017/0242148 | A1* | 8/2017 | Yu | G01F 17/00 |

OTHER PUBLICATIONS

"Supervised Learning", retrieved Feb. 24, 2017, from <<https://en.wikipedia.org/wiki/Supervised_learning>>, 8 pages.

Turk, et al., "Eigenfaces for Recognition", Journal of Cognitive Neuroscience, vol. 3, No. 1, 1991, 17 pages.

Wagner, P., "Face Recognition with GNU Octave/MATLAB", retrieved on Feb. 24, 2017, from <<http://www.mathcs.richmond.edu/~barnett/research/summer2013/facerec_octave.pdf>>, Jul. 18, 2012, 14 pages.

PCT Search Report and Written Opinion dated Jun. 6, 2018 for PCT Application No. PCT/US18/19405, 11 pages.

* cited by examiner

OPTICAL VIBROMETRIC TESTING OF CONTAINER FOR ITEMS

BACKGROUND

Modern inventory systems, such as those in mail order warehouses, supply chain distribution centers, airport luggage systems, and custom-order manufacturing facilities, include a number of complex systems, including robots, automated shelving systems, radio frequency identification (RFID), and automated scheduling and routing equipment. Some systems, for example, comprise robots that travel to shelving systems to retrieve items and return the items to a different location for additional processing.

Automated warehouses exist that use robots, for example, to move items or shelves from a storage location in the warehouse to a shipping location (e.g., for items to be boxed and shipped). It is inevitable, however, that some items in the inventory system will be dropped, misplaced, or otherwise mishandled during transfer. In addition, accurate inventories are important to control costs, maintain inventory levels, and meet customer demand, among other things. Correcting inventory records to reflect the actual locations of items can be very time-consuming and expensive.

Figure 1:
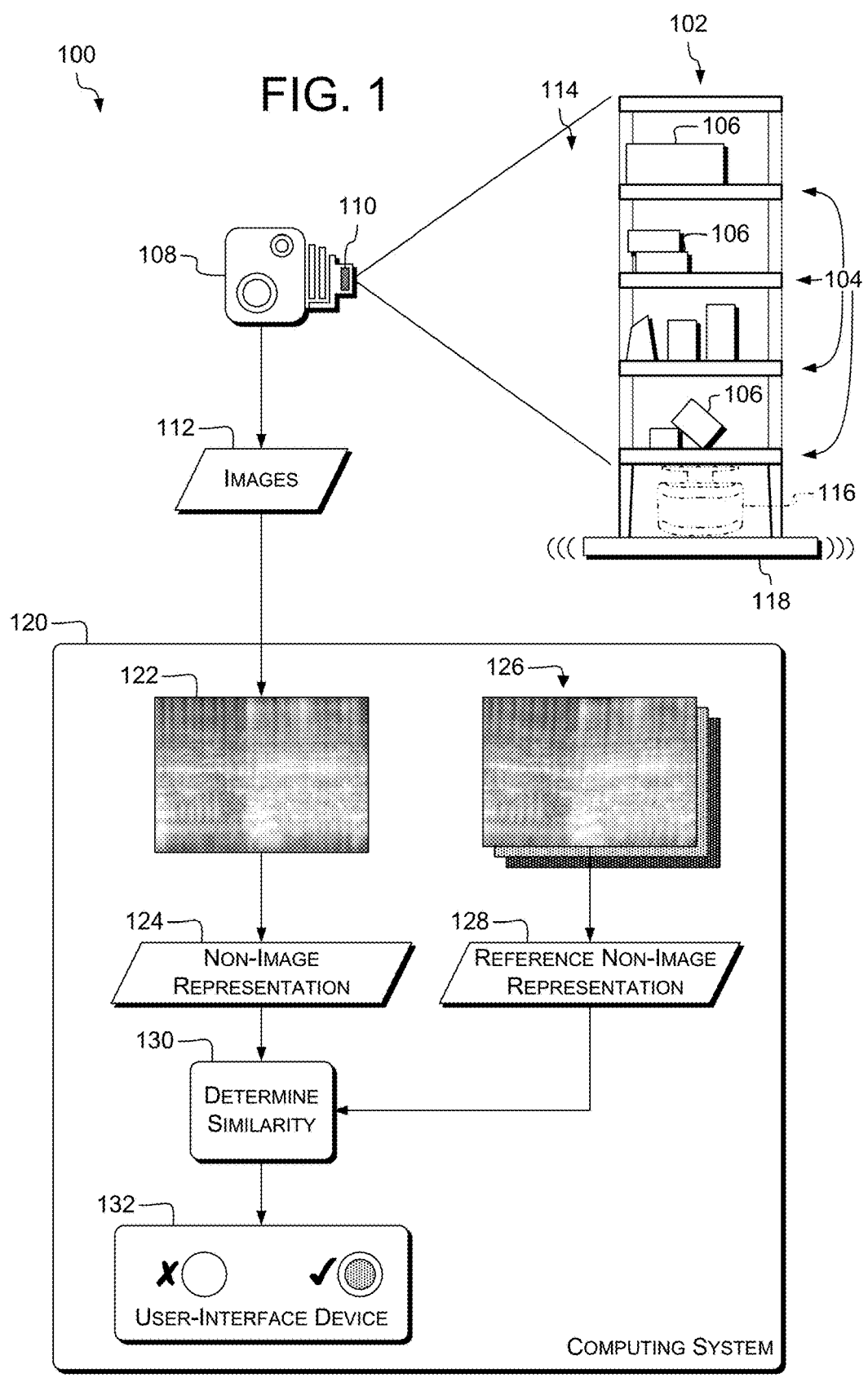
FIG. 1 is a schematic diagram of an example system of the present disclosure, related components, and example data items, and shows graphical representations of example images.

For brevity of illustration, in the diagrams herein, an arrow beginning with a diamond connects a first component or operation (at the diamond end) to at least one second component or operation that is or can be included in the first component or operation.

DETAILED DESCRIPTION

Described herein are systems, apparatuses, and methods relating to testing conditions of items in containers, e.g., items within an order-fulfillment environment. For example, techniques herein can be used to determine whether a particular item or number of items is in a particular container. For brevity, a "test article" as used herein is a container being tested to see whether it satisfies a condition, together with any item(s) in that container. Example systems herein may be configured to capture a plurality of images of a test article, e.g., an item in a container, and determine data of a vibrometric signature of the test article based on the images. Example systems may test the vibrometric signature against a reference vibrometric signature to determine whether the test article or the item in the container satisfies a condition, e.g., whether the correct item is at the correct place in the container. Failure of an item to satisfy a condition is referred to herein for brevity as an "inventory fault," but is not limited to inventory systems. Example inventory faults can include, e.g., discrepancies between the contents of a container and a software record of the contents of that container; an incorrect item in a container; or too many or too few items in a container.

Determining whether test articles or items in containers satisfy predetermined conditions can permit more rapidly detecting inventory faults, which can permit the faults to be more readily corrected. For example, detecting inventory faults within an order fulfillment facility may improve the throughput of the facility by permitting correcting the faults in parallel with other fulfillment operations, instead of delaying other fulfillment operations for the correction of faults. Some examples can permit detecting inventory faults, or testing other conditions of items, without the time required to open the containers or without the radiation exposure involved in X-ray analysis. As used herein, for brevity of description, substantially flat supports or other non-enclosing supports, such as trays, bowls, pallets, fabric cubbies, or shelves, are considered to be containers. Items on such supports are considered to be "in containers," also for brevity.

The apparatuses, methods, and systems described hereinafter as making up the various elements of the present disclosure are intended to be illustrative and not restrictive. Many suitable motion systems, capture devices, computing systems, or networks that would perform the same or a similar function as the systems described herein are intended to be embraced within the scope of the disclosure. Such other systems, apparatuses, and methods not described herein can include, but are not limited to, systems, networks, and technologies that are developed after the time of the development of the disclosure.

To simplify and clarify explanation, some examples are described herein in the context of inventory control systems such as those used in automated warehouses. One skilled in the art will recognize, however, that the disclosure is not so limited. While the system may be described as a system to manage warehouses, for example, it should be understood that the system may just as easily be used for testing conditions of test articles on assembly lines, in delivery or transport systems, and in many other environments. In some examples, techniques described herein can be used for inspecting conditions of machines, e.g., conveyor belts, sorters, engines, motors, or robots, or components thereof, or for testing operational efficiency of machines or components thereof. Moreover, "automated warehouses" as described herein can include at least some automatic item-handling machinery. In an automated warehouse, items may be handled entirely by automated systems, or may be handled partly by automated systems and partly by workers.

Illustrative Configurations

FIG. 1 illustrates an example of a system 100 for testing conditions of test articles, e.g., items in containers such as totes, bins (hard- or soft-sided), tubs, drawers, trays, or "pods" (open vertical shelving units including multiple shelves or open-front bins). Example pods, or shelves or bins therein, can be made at least partly from metal, plastic, fabric, or other materials. Example data processed by the system 100 is also depicted. For example, testing conditions can include detecting, recognizing, or classifying items in containers. FIG. 1 shows an example pod 102, which has multiple shelves 104 that can hold items 106. For brevity, not all items 106 are labeled. As shown, one or more items 106 can be present on a particular shelf 104. On shelves 104 holding multiple items 106, items 106 can be arranged wholly or partly on top of one another; one in front of the other; or one leaning on another. Items 106 can have various shapes, sizes, colors, reflectances, textures, or other visual attributes. Consequently, it can be difficult to accurately identify items 106 on a shelf 104 using automated systems.

Electronic camera 108 can capture images of pod 102, and of shelves 104 holding items 106. Electronic camera 108 can include or be mounted to optical components such as lenses or shutters, in some examples. Electronic camera 108 can be or include a color or monochrome camera, or a camera configured to detect light outside the visible range (e.g., infrared, IR, light). A pixel, e.g., of a color electronic camera 108, can include multiple subpixels, e.g., for red, green, and blue color channels.

Electronic camera 108 may be or include an electronic image sensor 110, e.g., a charge-coupled device (CCD) sensor, complementary metal-oxide-semiconductor (CMOS) sensor, or other optoelectronic sensor. Electronic image sensor 110 can be or include a line-scan sensor that captures a single row of pixels (px) or a small number of rows of pixels (e.g., four rows), or can be or include an area sensor that captures a two-dimensional array of pixels (e.g., 640 px×500 px). In some examples, a line-scan sensor can have an aspect ratio (pixels wide to pixels high, or active sensor area inches wide to inches high) greater than 4, and an area sensor can have an aspect ratio less than 4. Images captured by a line-scan sensor, or other images having aspect ratios greater than 4, are referred to herein for brevity as "stripe images."

Electronic camera 108 can successively capture individual images 112 of a plurality of images, e.g., using the electronic image sensor 110. For example, the individual images 112 can be successive exposures or captures at a fixed frame rate of the electronic camera 108, e.g., of at least 60 frames per second (fps). The images 112 can depict at least one item 106 in a container, e.g., on a shelf 104 or in a tub, bin, crate, conveyor belt, roller belt, lift, pallet, box, or other container. In some examples, an item, e.g., a bottle, serves as a container for material contained by or included within the item, e.g., shampoo in the bottle. A view volume 114 of the electronic camera 108 can include at least part of the container and at least part of the item 106. In some examples, pod 102 can be positioned in view volume 114 by a robot 116 (shown in phantom) or other motion system. Example frame rates can include 50 fps, 60 fps, 100 fps, 120 fps, 150 fps, frame rates in ranges greater than, or at least, any of those values, or frame rates in ranges between any two of those values, inclusive or exclusive (e.g., between 60 fps and 100 fps). Other example frame rates can include up to 1800 fps, or other rates provided by very-high-speed cameras. In some examples, the images 112 can be captured at a variable frame rate, e.g., with varying amounts of time between consecutive frames. In some examples, the images 112 can be or include frames of a video clip or clips.

While electronic camera 108 is capturing images 112, the pod 102 or other container (e.g., shelf 104), or items 106, may be vibrating. For example, vibrations transmitted through the floor or air from moving machinery (e.g., robot 116) can cause pod 102 or items 106 to vibrate. In an example of movable pods, if pod 102 has recently come to a stop, pod 102 may still be swaying or otherwise vibrating slightly, causing items 106 in pod 102 to vibrate or move. Similarly, after a stop, a first item 106 may rock, tip, or otherwise knock against a second item 106, causing the second item 106 to vibrate or move. Shifting of an item 106 within a container may also cause the container to move or vibrate. In an example of forced vibration, pod 102 can be supported by, or mechanically coupled to, a vibratory actuator 118, depicted as a shake table. Vibratory actuator 118 can additionally or alternatively include a solenoid, offset-weight motor, piezoelectric element, speaker, or other element that can provide kinetic energy at various frequenc(ies) to pod 102 or items 106 therein.

The vibrational mode(s) of pod 102, shelves 104, or items 106 depend on, and thus indicate, the physical properties and arrangement of the items 106 on the shelves 104. In general, an item in a container may vibrate in a way (e.g., at a natural frequency) that depends on the item, the container, or any other item(s) in the container. For example, a relatively more rigid object, such as a metal shelf, may vibrate at a higher frequency than a soft or relatively less rigid object, such as a fabric bin in a pod. In some examples, electronic camera 108 is configured to capture, in images 112, visual indications of the vibration of items 106 in their containers (here, shelves 104 of pod 102).

A computing system 120 can receive the images 112 and process them. Example implementations of the computing system 120 and related components are discussed herein with reference to FIG. 2. The computing system 120 can generate a consolidated image, represented graphically as consolidated image 122, based at least in part on the plurality of images 112. For example, the computing system 120 can concatenate a plurality of stripe images 112 to form the consolidated image 122. The illustrated consolidated image 122 represents a plurality of vertical stripe images 112 concatenated along a horizontal axis. The consolidated image 122 can be generated, or otherwise determined or processed, as a vector of pixel values, e.g., in a raster-scan order such as left-to-right, top-to-bottom, or in another order.

The computing system 120 can determine a non-image representation 124 of the consolidated image 122. For example, the non-image representation 124 can include coordinates of the vector representation of the consolidated image 122 in a predetermined basis. The basis can be, e.g., determined by Principal Components Analysis (PCA) or another eigenvalue decomposition, as discussed herein with reference to FIG. 5. The non-image representation 124 can be an example of a vibrometric signature.

Similarly, the computing system 120 can process a plurality of reference images of items 106 and containers, represented graphically as reference images 126. The reference images 126 can be images of items 106 and containers that satisfy the condition, e.g., expressed as a predetermined criterion. The computing system 120 can determine a reference non-image representation 128 representing the criterion. Examples are discussed herein, e.g., with reference to FIG. 5.

In some examples, the non-image representation 124 can represent relatively higher-spatial-frequency content of the consolidated image 122, and can exclude relatively lower-spatial-frequency content, e.g., absolute levels of illumination. This can provide robustness against, e.g., global illumination-level variations. In some examples, the non-image representation 124 can be a function of at least one of the container, the object, the frame rate of capture, the camera electronics, or other factors. In some examples, the non-image representation 124 and the reference non-image representation 128 can be determined based on images captured with the same type of camera at the same frame rate. This can permit more effectively detecting characteristics of the test article.

The computing system 120 can determine whether the non-image representation 124 satisfies the criterion. In the illustrated example, the criterion is satisfied if the non-image representation 124 is sufficiently similar to the reference non-image representation 128. The computing system 120, at operation 130, can determine an indication of similarity between the non-image representation 124 and the reference non-image representation 128. Examples are discussed herein, e.g., with reference to FIG. 8 or 9. If the non-image representation 124 satisfies the criterion, the test article satisfies the condition.

The computing system 120 can include a user-interface device 132, illustrated as a go/no-go indicator. The computing system 120 can present the indication of similarity, e.g., as a "go" indicator, depicted as a light next to a check mark, if the non-image representation 124 and the reference non-image representation 128 are sufficiently similar, or as a "no-go" indicator, depicted as a light next to an "X," if not. In the illustrated example, the "go" indicator is presented. Although the illustrated consolidated image 122 and the illustrated reference image 126 are not identical, they are sufficiently similar that the consolidated image 122 is considered to correspond to the reference image 126, and thus to satisfy the condition.

In some examples, the consolidated image 122 and the non-image representation 124 can correspond to an entire container, e.g., an entire pod 102 or shelf 104. In other examples, the consolidated image 122 and the non-image representation 124 can correspond to specific items 106 in a container, or to the container itself. In some examples, the vibration of one object is affected by objects with which it is mechanically coupled or interrelated. Therefore, in some examples, capturing stripe images 112, e.g., single-pixel-wide stripe images, can permit determining whether an item 106 in a container satisfies a condition.

Figure 2:
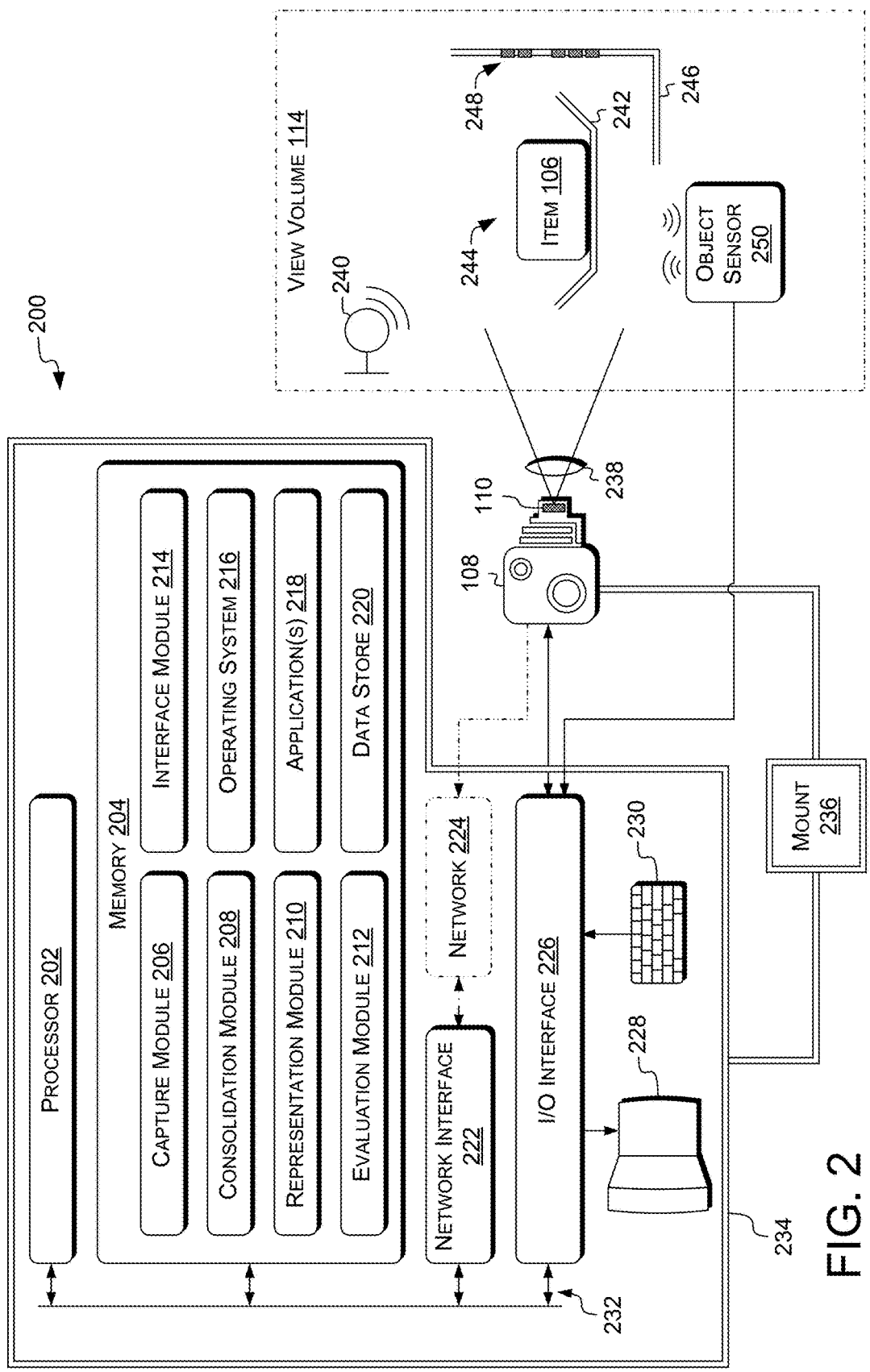
FIG. 2 is a schematic diagram of an example computing system and related components, and depicts example objects that can be imaged.

FIG. 2 shows a schematic of an example computing system 200 and related components. Also shown are example objects that can be imaged, as discussed below with reference to view volume 114. Computing system 200 can represent system 100 or components thereof, e.g., electronic camera 108, robot 116, or computing system 120, or inventory control system 1200 (FIG. 12) or components thereof, e.g., management system 1204 or imaging system 1212. Computing system 200 can be configured to capture images, test conditions of items, or perform other operations described herein. In FIG. 2, doubled lines and outlines represent physical components.

In the illustrated example, computing system 200 includes one or more processor(s) 202 communicatively coupled with a memory 204. Memory 204 can be implemented as any combination of various types of memory components, e.g., at least one computer-readable media (CRM) or computer storage media component. Examples of possible memory components include a random access memory (RAM), a disk drive, a mass storage component, and a non-volatile memory (e.g., ROM, Flash, EPROM, EEPROM, etc.).

Processor(s) 202 process various instructions to control the operation of computing system 200 and to communicate with other electronic and computing devices. For example, the processor(s) 202 can be configured to execute modules of a plurality of executable modules or other software programs stored in the memory 204. In some examples, the computer-executable instructions stored in the memory 204 can, upon execution, configure a computer such as a computing system 200 to perform operations described herein with reference to modules described below. The modules stored in the memory 204 can include instructions that, when executed by the one or more processor(s) 202, cause the one or more processor(s) 202 to perform operations described herein, e.g., with respect to the modules.

The memory 204 stores various information or data, including, for example, at least a capture module 206, a consolidation module 208, a representation module 210, an evaluation module 212, an interface module 214, an operating system 216, or one or more other applications 218. Functionality described associated with the illustrated components or modules can be combined to be performed by a fewer number of components or modules or can be split and performed by a larger number of components or modules. The other applications 218 can include, for example, inventory-management software or communications software such as for communication between a motion system and the management system 1204.

In some examples, the capture module 206 can operate electronic camera 108 or electronic image sensor 110 to capture images 112 or reference images 126. Additionally or alternatively, the capture module 206 can receive images 112 or reference images 126 from a separate capture device or subsystem, e.g., via network 224, discussed below. The capture module 206 can carry out at least one of operations 602, 604, 802, 902, or 1104 (discussed below, and likewise throughout the discussion of FIG. 2).

In some examples, the consolidation module 208 can generate consolidated images 122. The consolidation module 208 can carry out at least one of operations 402, 608 (at least in part), 804, or 904.

In some examples, the representation module 210 can determine non-image representations 124 or 128. The representation module 210 can carry out at least one of operations 404 (at least in part), 504, 508, 510, 514, 608 (at least in part), 612 (at least in part), 702, 704, 706, 806, 808, or 906.

In some examples, the evaluation module 212 can determine whether a consolidated image 122 or non-image representation 124 satisfies a criterion associated with a condition. The evaluation module 212 can carry out at least one of operations 130, 404, 512, 518, 612, 708, 810, 812, or 908.

In some examples, the interface module 214 can operate, receive data from, or otherwise interact with other components, e.g., a motion system such as robot 116, a vibratory actuator 118, or a user-interface device 132. The interface module 214 can carry out at least one of operations 1002, 1010, 1102, or 1106.

In the illustrated example, memory 204 includes a data store 220. In some examples, data store 220 can store information described herein with reference to FIG. 1 or 3-12, e.g., information of captured images 112, consolidated images 122, non-image representations 124 or 128, bases, or training data such as training images 502, FIG. 5.

The illustrated computing system 200 can include one or more network interface(s) 222 that can permit computing system 200 to communicate with other computing systems 200 via one or more network(s) 224 (shown in phantom). Network 224 can represent a local- or wide-area network, e.g., an Ethernet or optical network, a cellular network, or the Internet. Additionally or alternatively, network interface(s) 222 can be communicatively connectable with electronic camera 108 or electronic image sensor 110.

In some examples, network interface(s) 222 can establish or facilitate receiving wired or wireless network service. In some examples, at least one of the network interface(s) 222 can include, but is not limited to, a transceiver for Ethernet, cellular (3G, 4G, or other), WI-FI, ultra-wideband (UWB), BLUETOOTH, satellite, or other wireless transmissions. At least one of the network interface(s) 222 can include a wired I/O interface, such as an Ethernet interface, a serial interface, a Universal Serial Bus (USB) interface, an INFINIBAND interface, or other wired interfaces.

The illustrated computing system 200 can include one or more input/output (I/O) interfaces 226. In some examples, I/O interfaces 226 can include, or be communicatively connected with, electronic camera 108 or electronic image sensor 110. Additionally or alternatively, I/O interfaces 226 can include, or be communicatively connected with, a display device 228, which can represent user-interface device 132, enabling computing system 200 to present video or other visual content. In example implementations, I/O interface 226 provides signals to a touchscreen or other display device that displays indications discussed above with reference to user-interface control 132.

I/O interface(s) 226 can additionally or alternatively include, or be communicatively connected with, for example, a user-operable input device 230 (graphically represented as a keyboard), enabling a user to, e.g., direct computing system 200 to test an item 106 with respect to a condition, capture images 112, or perform other functions described herein. User-operable input device 230 can include, e.g., a touch sensor over a touchscreen, a user-operable button, switch, or other physical input control, an optical sensor, e.g., to detect finger position with respect to a screen, a mouse, a trackball, a joystick, or a pointing stick such as a TRACKPOINT.

Computing system 200 can include a system bus 232 connecting the various components within computing system 200. System bus 232 can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, e.g., a Mezzanine bus.

Although shown separately, some of the components of computing system 200 can be implemented together in a single hardware device, such as in a Field-Programmable Gate Array (FPGA), an Application Specific Integrated Circuit (ASIC), Application-specific Standard Product (ASSP), System-On-a-Chip system (SoC), Complex Programmable Logic Device (CPLD), Digital Signal Processor (DSP), or other type of customizable processor. For example, a processor 202 can represent a hybrid device, such as a device from INTEL (formerly ALTERA) or XILINX that includes a CPU core embedded in an FPGA fabric. These or other hardware logic components can operate independently or, in some instances, can be driven by a CPU. In some examples, processor 202 can be or include one or more single-core processors, multi-core processors, central processing unit (CPUs), graphics processing units (GPUs), general-purpose GPUs (GPGPUs), or hardware logic components configured, e.g., via specialized programming from modules or APIs, to perform functions described herein.

In some examples, any (or any combination) of components 202-232 can be included in, e.g., affixed to or physically incorporated within, a chassis 234, e.g., a metal, plastic, or wood frame or housing. In some examples, chassis 234 can mechanically support electronic camera 108 or electronic image sensor 110. In some examples, chassis 234 or components therein can be connected with electronic camera 108 or electronic image sensor 110 via a cable or other element that does not provide mechanical support to electronic camera 108 or electronic image sensor 110. In some examples, at least one of the electronic camera 108, the display 228 (e.g., user-interface device 132), or the input device 230 can be remote from other components of computing system 200, e.g., chassis 234 and connected thereto, e.g., via network 224 or I/O interface 226.

In some examples, at least one of chassis 234, electronic camera 108, or electronic image sensor 110 can be supported by a mount 236, e.g., a clamp, bracket, articulating arm, boom stand, actuator, or robot. In some examples, mount 236 can include vibrational isolation, or otherwise be a vibration-resistant mount, to steady electronic camera 108 or electronic image sensor 110. For example, mount 236 can include at least one damper or compliant layer. In some examples, mount 236 can retain the electronic camera 108 or electronic image sensor 110 in position to permit effective measurement, e.g., substantially looking down on a pallet, or substantially looking straight ahead at the face of a pod 102.

In some examples, mount 236 can permit movement in, or include actuators for, one or more degrees of freedom (DOF) of component(s) supported by mount 236, e.g., six DOF. For example, mount 236 can include actuators to adjust the orientation of electronic camera 108 in at least one of roll, pitch, yaw, or to adjust the position of electronic camera 108 along at least one axis, e.g., at least one of two or three orthogonal axes. For example, mount 236 can permit alignment of partial images showing features of test article(s), e.g., as discussed herein with reference to FIG. 3. For example, mount 236 can rotate so that partial images extend substantially along or substantially across edges of a test article being imaged, as discussed herein with reference to operations 1004 and 1006, FIG. 10. Some examples herein can test conditions regardless of camera position or orientation by testing based on the amplitude or frequency of vibrations rather than on the absolute magnitude or appearance of those vibrations.

In the illustrated example, electronic camera 108 is capturing an image of view volume 114. Any of the objects depicted within view volume 114 can be included in computing system 200 or can be separate from computing system 200; those objects are shown here for clarity of explanation. The illustrated system comprises optics 238 (depicted as a lens but not limited thereto) arranged with respect to the electronic image sensor 110 to define the view volume 114 of a common capture region of the electronic image sensor 110, e.g., a pixel set as discussed herein with reference to FIG. 3.

Lamp 240 is configured to illuminate at least a portion of at least one of item 106 or container 242 of test article 244 in view volume 114. For example, lamp 240 can include at least one LED, fluorescent, or other illumination panel; LED, fluorescent, or incandescent bulb; or other light source or combination of light sources. Lamp 240 can additionally or alternatively include at least one optical component, e.g., a lens, diffuser, or mirror configured to provide a desired illumination to at least a portion of the item 106 or the container 242. Container 242 is depicted as a tray, but can additionally or alternatively include at least a portion of a pod 102, shelf 104, tote, bin, box (cardboard, plastic or other), or bag (paper, plastic, or other).

Visual reference object 246 is an object at least partly visible by electronic camera 108, and at least partly distinguishable by computing system 200. Visual reference object 246 can be or include, e.g., at least part of a wall or floor within view volume 114 and bearing a pattern that can be detected by computing system 200. Additionally or alternatively, visual reference object 246 can be or include at least one an optical test target, optical test card, fiducial, optical knife-edge, or other optically-detectable feature. In the illustrated example, visual reference object 246 includes a horizontal portion and an upright portion, as depicted. A visual reference pattern 248 including stripes is arranged on the upright portion and is optically detectable.

In some examples, visual reference object 246 is substantially stationary or non-vibratory compared to item 106 or container 242. Accordingly, images of visual reference object 246 can indicate vibration of the electronic camera 108 rather than vibration of the item 106 or container 242. Examples of compensating for camera vibration using images of visual reference object 246 as discussed herein with reference to FIG. 6.

Object sensor 250 can be configured to detect the presence of item 106 or container 242 within view volume 114. Object sensor 250 is depicted as a sonar or other range sensor, but this is not limiting. Object sensor 250 can be or include a range sensor, such as a laser rangefinder or sonar sensor, an optical sensor configured to detect, e.g., a barcode or other reference mark on item 106 or container 242, an optical sensor configured to detect obscuration of visual reference pattern 248 or other portion(s) of visual reference object 246, a pressure sensor such as a scale to detect weight of item 106 or container 242, or a button or switch that is depressed by proper positioning of item 106 or container 242. In some examples, an optical object sensor 250 can include components such as those described herein with reference to electronic camera 108 or electronic image sensor 110.

In some examples, object sensor 250 can include multiple sensing units. For example, object sensor 250 can include a laser sensor, optointerruptor, or other optical sensor that detects presence of a test article. Object sensor 250 can also include a camera or other optical sensor. Object sensor 250 can also include or be communicatively connected with a processor. In response to detection of the test article by the laser sensor, the processor can cause the camera to capture a single frame or a small number of frames, e.g., including a barcode. The processor can then decode the barcode to determine whether a desired test article, e.g., including a particular type of container or a particular uniquely-numbered container, is present at least partly in the view volume 114.

In some examples, at least one of lamp 240 or object sensor 250 can be positioned outside view volume 114. In some examples, a portion, but less than all, of visual reference object 246 can be positioned outside view volume 114.

Any of the processing components illustrated in FIG. 2 can be implemented in hardware, software, or a combination of hardware and software. Further, any of the storage components illustrated in FIG. 2, e.g., memory 204, can be implemented using any form of computer-readable media that is accessible by computing system 200, either locally or remotely, including over a network 224.

Computer-readable media includes two types of computer-readable media, namely computer storage media and communications media. Computer storage media (e.g., a computer storage medium) includes tangible storage units such as volatile memory, nonvolatile memory, or other persistent or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including, but not limited to, random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing system 200. In some examples, memory 204 can be or include at least one computer storage medium, e.g., a tangible, non-transitory computer-readable medium.

In contrast to computer storage media, communication media can embody computer-readable instructions, data structures, program modules, or other data in a modulated data signal, such as a carrier wave, or other transmission mechanism. As defined herein, computer storage media does not include communication media.

Figure 3:
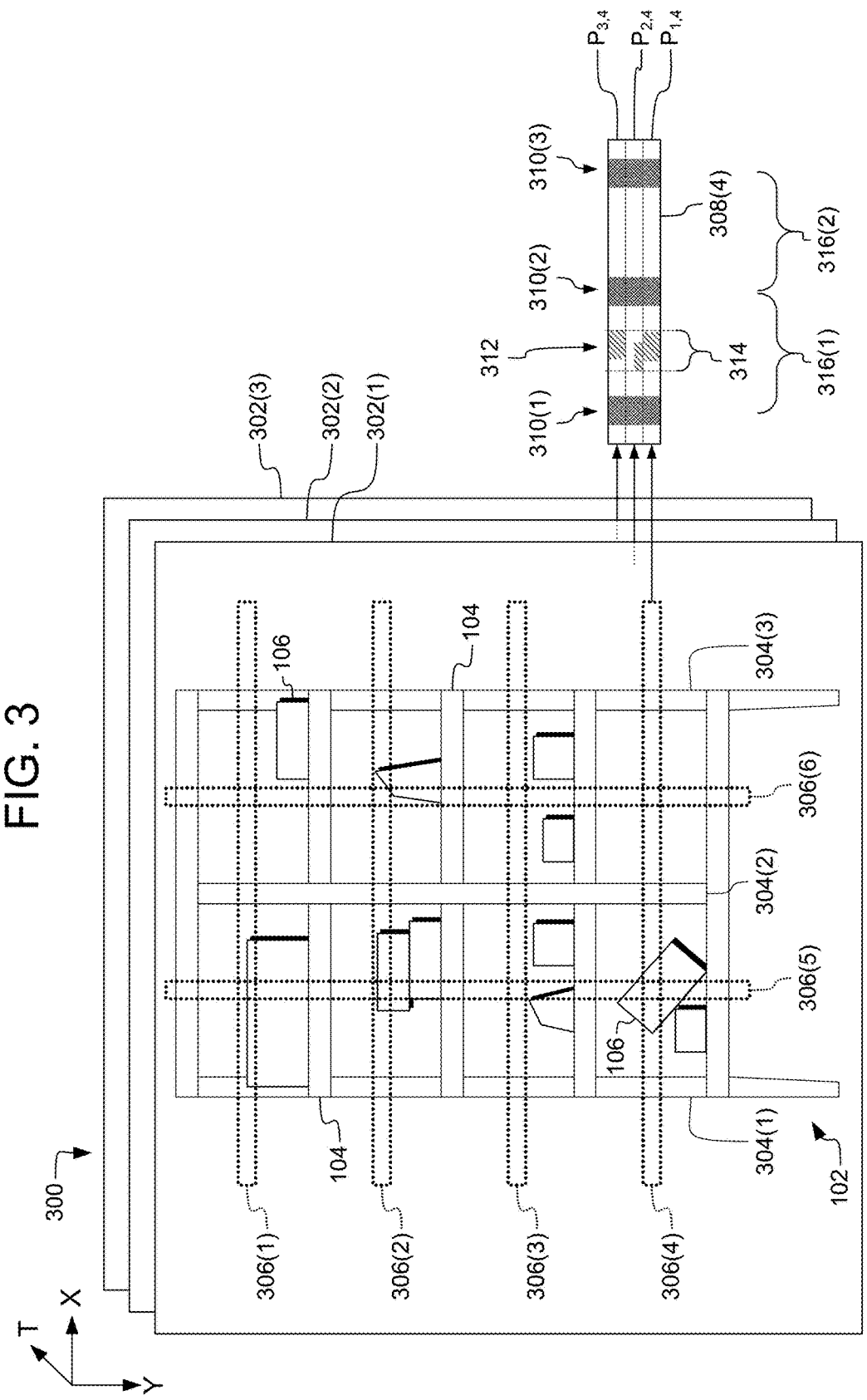
FIG. 3 is a schematic diagram of an example set of captured images and of an example consolidated image.

FIG. 3 shows a graphical representation of a set 300 of captured images 302(1)-302(3) (individually or collectively referred to herein with reference 302). Images 302 can represent a captured images 112. Images 302 can be associated with (e.g., captured at) respective, different times T. For example, for capture at 100 fps, images 302(1)-302(3) can be associated with T=0 ms, 10 ms, and 20 ms, respectively.

In this example, captured images 302 are substantially front views of a pod 102 having a plurality of shelves 104 (containers; eight are shown). Some of the shelves 104 are holding items 106. For clarity, some shelves 104 and some items 106 are unlabeled. Pod 102 includes three vertical dividers 304(1)-304(3): left, center, and right, respectively.

Captured image 302(1) includes image data of six partial images 306(1)-306(6) (individually or collectively referred to herein with reference 306). Partial images 306 are depicted as heavy dotted outlines. Partial images 306 can represent stripe images 112 or portions of other captured images 112. Each partial image 306 can be associated with a respective common capture region of the electronic camera 108.

As shown, a particular partial image 306 may include image data of no items (top right), one item (top left), two items (left, second down), or any other number of items. However, in examples such as that of the top-right illustrated bin, even though partial image 306(6) does not include image data of the item 106 on the top-right shelf 104, the vibration of that shelf 104 may still be affected by the item 106. Therefore, partial image 306(6) can still be useful for testing whether the item 106 on the top-right shelf 104 satisfies a condition. Further examples are described herein with reference to operation 702.

In some examples, the data of each partial image 306($p$) can be provided by a particular set $S_p$ of pixels of the electronic camera 108 (e.g., of the electronic image sensor 110 therein). Set $S_p$ can represent the common capture region associated with partial image 306($p$). Each image 302 can include its own partial images 306($p$) provided by respective pixel sets $S_p$ (here, p=1, 2, . . . , 6). Comparing those partial images 306 to each other can permit determining vibrational properties of the containers or items 106 imaged at least partly by the respective common capture region.

Denote captured image 302($j$) as $I_j$. Then partial image 306($p$) within image $I_j$ is $P_{j,p}$. Operation 804 can include concatenating partial images $P_{j,p}$ for all j to form a consolidated image $C_p$ associated with partial images 306($p$) across multiple captured images 302($j$), e.g., multiple frames. In this example, consolidated image 308(4) is shown. Consolidated image 308(4) includes a vertical stack of data from horizontal partial images 306(4) of image 302(1) ($P_{1,4}$), of image 302(2) ($P_{2,4}$), and of image 302(3) ($P_{3,4}$). In some examples, each partial image 306 can be, e.g., 640 pixels (px)×10 px. In some examples using ten such partial images 306 in a consolidated image 308, consolidated image 308 can be, e.g., 640 px×100 px. This is well below the pixel count of a full frame from a conventional 4:3 or 16:9 imager, permitting processing the consolidated image 308 with reduced memory and computational requirements than schemes requiring analysis of full frames of image data. These sizes are for purposes of illustration and are not limiting.

In some examples, identical pixel sets $S_p$ or substantially identical pixel sets $S_{j,p}$ can be used in generating consolidated images 122 for captured images 302($j$), j=1, . . . , J. Since the same (or substantially the same) pixels $S_p$ are being used for each partial image 306($p$) within a particular consolidated image 308($p$), changes between the partial images $P_{j,p}$ in consolidated image 308($p$) can be indicative of vibration.

The illustrated consolidated image 308(4) includes image data regions 310(1)-310(3) representing, associated with, or depicting dividers 304(1)-304(3), respectively. In this example, the dividers 304 are substantially stationary with respect to the pixel set $S_4$ over the course of the three captured images 302. Therefore, image data regions 310(1)-310(3) do not show movement of the dividers 304.

The illustrated consolidated image 308(4) also includes image data region 312 representing the labeled item 106 on the lower-left shelf. As shown, and as depicted exaggerated for clarity, item 106 has moved to the left and down between image 302(1) and 302(2), and has moved to the right and up between image 302(2) and 302(3). The amplitude (lateral amplitude 314 or amplitude in another direction) or the frequency of the motion can indicate how item 106 is vibrating, and can be used to test a condition of the item 106 on the respective shelf 104. For example, if the amplitude or frequency of the motion differs from an expected amplitude or frequency associated with the condition, it can be determined that the item does not satisfy the condition.

In some examples, captured area images 302, partial images 306, or combinations thereof can be subdivided further. For example, consolidated image 308(4), or partial images $P_{1,4}$, $P_{2,4}$, and $P_{3,4}$, can be divided into any number of regions, illustrated as regions 316(1) and 316(2). This can permit localizing errors in a pod 102 or other assembly of a plurality of containers (here, shelves 104). In the illustrated example, testing region 316(1) independently from region 316(2) can permit more effectively determining whether an inventory fault is in the lower-left shelf 104 or the lower-right shelf 104.

In some examples, partial images 306 or consolidated images 308 can be divided into any number of regions. For example, in a 3×3 grid of containers, e.g., a pod three shelves 104 high and three shelves 104 wide, three vertical partial images 306 can be captured, one per column of shelves 104, and three horizontal partial images 306 can be captured, one per row of shelves 104. Each partial image 306 can then be divided into three regions 316. Each of the nine shelves 104 is then associated with exactly one region 316 of one horizontal partial image 306 and with exactly one region 316 of one vertical partial image 306, in this example. The two regions 316 associated with each shelf 104 can be used to test condition(s) of item(s) on that shelf 104.

In some examples, the partial images 306($p$) are extracted from pixel sets $S_p$ of a single electronic image sensor 110. For example, a partial image 306($p$) can include pixels of the electronic image sensor 110 arranged in at least one of the following ways: a single row, a single column, multiple adjacent rows, multiple adjacent columns, multiple rows that may be adjacent or spaced apart, multiple columns that may be adjacent or spaced apart, a diagonal row or rows, whether adjacent or spaced apart, or a curve of thickness one pixel or greater. In some examples, a single-row or single-column pixel set is used to collect data for a single item in a single container, or a multi-row or multi-column pixel set is used to collect data for multiple items or multiple containers.

In some examples, a partial image 306($p$) can include pixels $S_p$ selected according to a predetermined regular, random (or pseudo-random, and likewise throughout this document), or chaotic pattern. In such a pattern, any particular pixel may be adjacent to at least one other pixel in the pattern, or may be spaced apart from all other pixels in the pattern. For example, the pattern may comprise a regular grid arranged on two axes, orthogonal or non-orthogonal. Any axis may be oriented with the rows or columns of the electronic image sensor 110 or at an angle to the rows or columns.

In some examples, a partial image 306($p$) can be determined by subsampling or interpolating between pixel data values; by rotating, scaling, or otherwise transforming captured stripe images in software; or by otherwise processing the pixel data values so that the same (or substantially the same) pixel set $S_p$ is used for each partial image $P_{j,p}$, j=1, . . . , J.

In some examples, at least two of the partial images 306($p$), or all of the partial images 306($p$), are extracted from pixel sets $S_p$ of respective, different electronic image sensors 110. In the example of FIG. 3, six line-scan electronic image sensors 110 can be used to capture the respective partial images 306(1)-306(6). In examples using only line-scan electronic image sensors 110, full-frame image data may not be captured, and each captured image 302 may correspond to exactly one partial image 306.

In some examples, capturing stripe images can permit estimating vibration in a direction substantially along the axis of the stripe image, as in the example of consolidated image 308(4). In some examples, capturing stripe images can permit estimating vibration in a direction substantially across the axis of the stripe image, since such vibration can cause objects to move in and out of the stripe image. In some examples, vibration can be estimated in any direction, regardless of the orientation of any particular stripe image.

The electronic image sensor 110 can include the pixels of the common capture region (e.g., $S_p$) and pixels outside the common capture region. For example, light from objects in the view volume 114 can be focused onto a central common capture region of the electronic image sensor 110, and light from objects outside the view volume 114 can be focused onto pixels surrounding the central common capture region. In some examples, the pixels of the common capture region are arranged substantially along a primary capture axis. For example, for a stripe image, the primary capture axis can be the long axis of the stripe.

In FIG. 3, specific numbers of shelves 104, items 106, images 302, and partial images 306, and particular arrangements of consolidated images 308, are shown for clarity of explanation. These are illustrative and not limiting. Similarly, various resolutions of electronic camera 108 or electronic image sensor 110 can be used. In some examples, a relatively higher resolution can be used for containers holding relatively more items 106 or containers, or relatively smaller items 106, and a relatively lower resolution can be used for containers holding relatively fewer items 106 or containers, or relatively larger items 106. In some examples, the same resolution can be used for stripe images oriented in different directions (e.g., partial images 306(4) and 306(5)); in other examples, different resolutions can be used for such stripe images. In some examples, relatively more lines of pixels can contribute to stripe images for which relatively higher precision is required (or higher accuracy or resolution, and likewise throughout this discussion), e.g., smaller items 106 or other situations above. Relatively fewer lines of pixels can contribute to stripe images for which relatively lower precision is required, e.g., larger items 106 or other situations above.

In some examples, the arrangement of partial images 306 is selected based at least in part on the type of a container or the expected contents of the container. For example, if a bin is expected to include ten books standing upright, a horizontal, diagonal, or other substantially non-vertical partial image 306 can be used to provide data associated with each of the ten books. In some example, if a container is expected to include multiple items, multiple partial images 306 can be used, at least one at the respective expected position of each of the items. In some examples, partial images 306 oriented substantially along two orthogonal axes are used to permit determining vibration information in two directions.

In some examples, the arrangement of partial images 306 is selected based at least in part on an extent of the container. For example, a pallet can hold a stack of multiple boxes. The edges of the stack can be detected, e.g., optically, using object-recognition algorithms, or using range sensors such as laser time-of-flight sensors. Partial images 306 can then be arranged along or across the detected edges. Such positioning can provide improved detection of a vibration component transverse to the main axis of that partial image 306, since such vibration may cause the stack to enter and leave the field of view of a partial image 306 arranged along the edge or to move a measurable distance in a partial image 306 arranged across the edge. In some examples that detect the extent of a container, partial images 306 can be arranged within that extent, e.g., by selecting pixels of a common capture region within the area that images the extent of the container.

In the illustrated example, some of the partial images 306 include image content of items 106. Others of the partial images 306 do not include image content of items 106, e.g., partial image 306(3). Any number of partial images 306 imaging items and containers, or any number of partial images 306 imaging only containers, can be used in any combination.

Illustrative Processes

Figure 4:
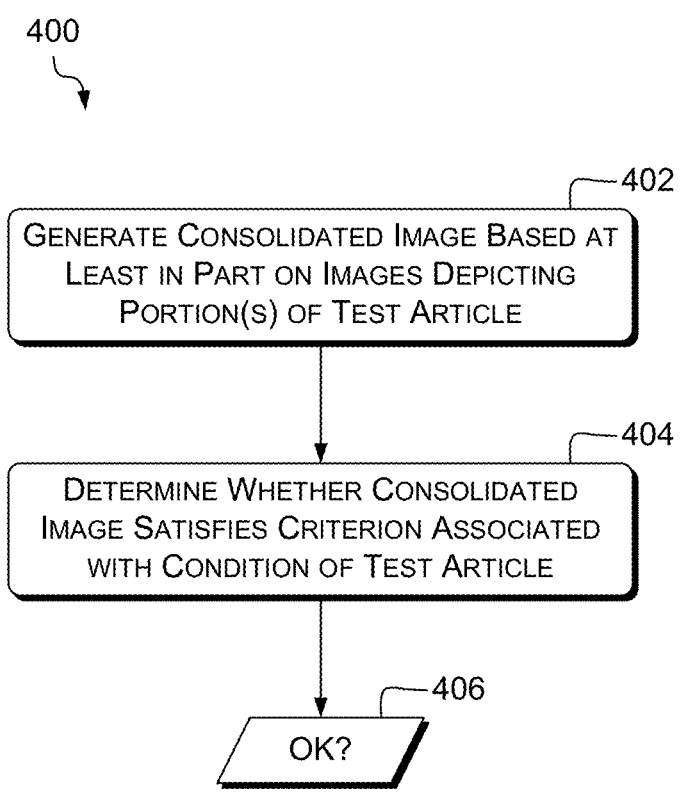
FIG. 4 is a dataflow diagram of an example process for testing a condition of a test article.

FIG. 4 is a flow diagram of an example process 400, and shows related data items. For example, process 400 can be used for testing a condition of a test article comprising a container. The test article can include an item 106 in the container. For clarity of explanation, reference is made to various components and data items shown in FIGS. 1-3 that can carry out or participate in the steps of the exemplary methods, e.g., computing system 120. It should be noted, however, that other components can be used; that is, exemplary methods shown in FIGS. 4-11 are not limited to being carried out by the identified components. For example, image capture and other operations as discussed herein with reference to FIGS. 4-11 can additionally or alternatively be directed or carried out by the electronic camera 108, the electronic image sensor 110, a dedicated calibration device such as a computer component of a calibration fixture, or another device, e.g., having components described with reference to FIG. 1 or 2.

The condition being tested can include, e.g., the identity of an item; a state of the item (e.g., whether a bottle is empty or full); or other conditions described herein with reference to inventory faults. In addition to those listed above, example inventory faults can include, e.g., a damaged item in a container, such as a leaking tube or bottle; a counterfeit item in a container; incorrect packaging of an item in a container (e.g., newsprint padding instead of bubble wrap, or too much or too little padding); or the correct item in an incorrect container (e.g., an inlaid gemstone globe in an envelope instead of a box). Inventory faults can additionally or alternatively include a combination of other faults described herein, e.g., a container holding item "A" and a damaged item "B" when inventory data indicates that container should be holding items "C" and "D." In some examples, the condition can include that the item is of a predetermined type, e.g., a book, a compact disc (CD), or a figurine.

In FIGS. 4-11, example methods are illustrated as sets of operations shown as discrete operations. The methods can be implemented in any suitable hardware, software, firmware, or combination thereof. For example, operations shown in FIGS. 4-11 can be implemented on or otherwise embodied in one or more computing systems 120 or electronic cameras 108, e.g., using software running on such devices. In the context of software, operations illustrated in FIGS. 4-11 can represent computer-executable instructions, e.g., of modules 206-214, that, when executed by one or more processors 202, cause the one or more processors 202 to perform the recited operations. In the context of hardware, the illustrated operations can represent logic functions implemented in circuitry, e.g., datapath-control and finite-state-machine sequencing functions.

The order in which the operations are described is not to be construed as a limitation. Any number of the described operations can be performed in any order except when otherwise specified, or when data from an earlier operation is used in a later operation. In some examples, any illustrated operation can be followed, or can be directly followed, by any operation illustrated as being subsequent to that operation through one or more arrows, unless otherwise indicated (e.g., by data dependencies between operations).

At 402, computing system 120 can generate a consolidated image 122 based at least in part on the plurality of images 112. Individual ones of the images 112 can depict at least a portion of a test article 244 that includes at least one container. Examples are discussed herein, e.g., with reference to FIG. 1 or 3. In some examples, the computing system 120 can generate the consolidated image 122 based at least in part on all of, or fewer than all of, the multiple images 112, e.g. stripe images. For example, the computing system 120 can rotate, scale, shear, or concatenate multiple images 112, or respective portions thereof, along an axis to form the consolidated image 122.

At 404, computing system 120 can determine whether the consolidated image 122 satisfies a predetermined criterion associated with the condition, e.g., associated with a condition of the test article 244. Details of some examples are discussed herein, e.g., with reference to operations 512, 612, 708, 810, 812, 908, or 1112, or FIG. 3. The computing system 120 can provide flag 406, which can represent flag 814 or 910, carrying the indication.

Figure 5:
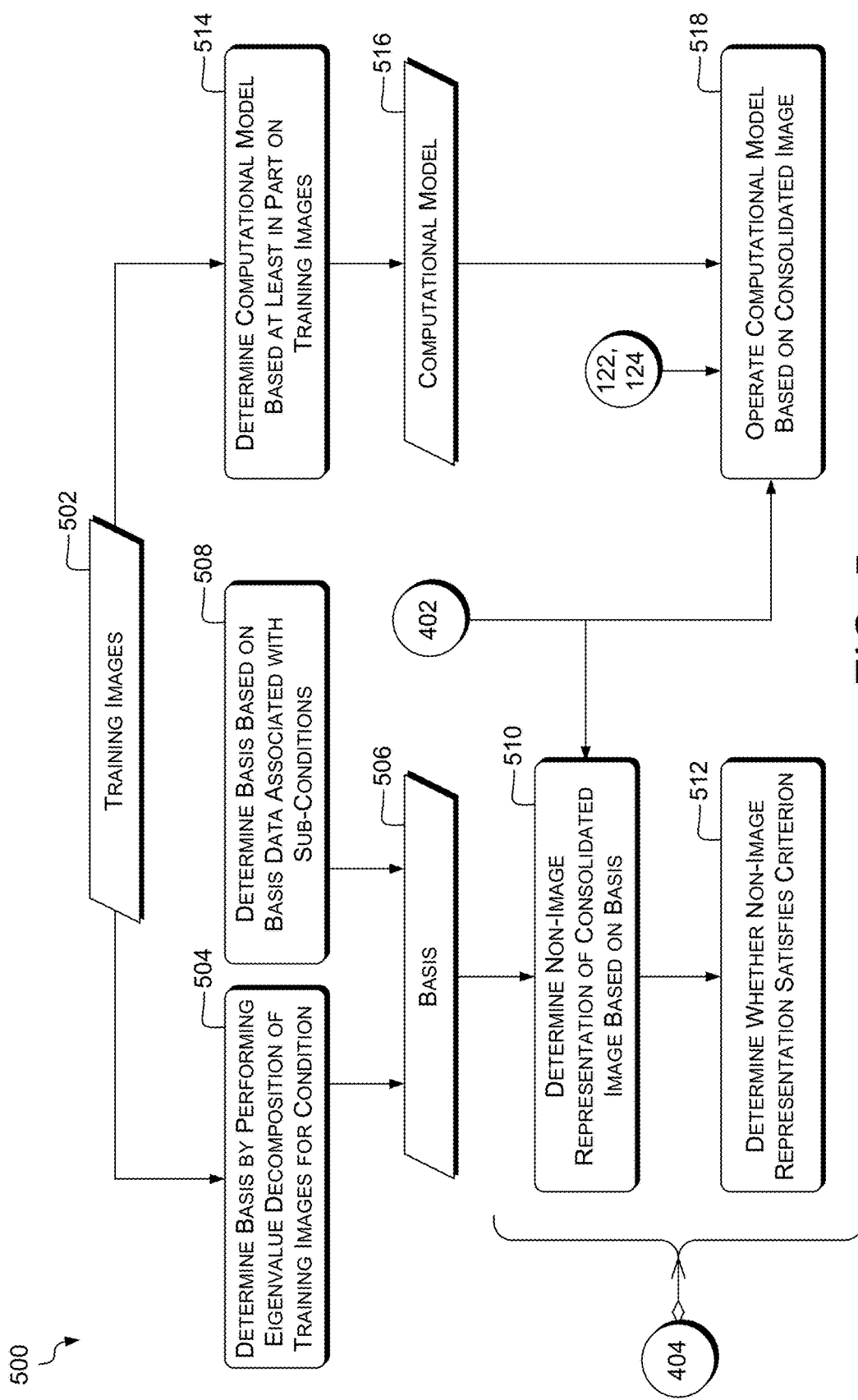
FIG. 5 is a dataflow diagram of an example process for testing a condition of a test article.

FIG. 5 is a flow diagram of an example process 500 for testing a condition of a test article, e.g., by determining whether a consolidated image satisfies a criterion associated with the condition. In some examples, operation 402 can be preceded by operations 504 or 508. In some examples, operation 404 can include operations 510 and 512, or operation 518. In some examples, operation 518 can receive as input consolidated image 122 or non-image representation 124.

In some examples, process 500 receives as input a plurality of training images 502 associated with the condition. The training images 502 can represent consolidated images associated with captures of test articles known to satisfy the condition, e.g., reference images 126. For example, a warehouse shipping a number of the same type of test article, e.g., a Mike Oldfield CD in a padded mailer, can capture images 112 of each test article before it is shipped. The computing system 120 can then determine a respective consolidated image 122 for each individual test article from the captured images 112 of that test article. Those consolidated images 122 can be the training images 502.

In some examples, e.g., of a warehouse setting, customer feedback can be used to determine whether an item was correctly packaged. For example, if feedback is received that a mailed item included a one-CD basic edition rather than a two-CD deluxe edition, the consolidated image 122 associated with that mailed item can be removed from the set of training images 502. In some examples, consolidated images 122 can be added to the set of training images 502 after a certain time period after mailing has elapsed with no negative feedback received.

At 504, the computing system 120 determines a basis 506. Operation 504 can include performing an eigenvalue decomposition of the training images 502. The eigenvalue decomposition can include, e.g., a principal-components analysis (PCA), which mathematically minimizes mean-square error. In some examples, the computing system 120 can reshape each training image 502 to a vector in, e.g., raster-scan order, and compute the eigenvalue-decomposition basis vectors of the resulting set of training vectors. The basis 506 can be or include the basis vectors. The basis vectors can be reshaped back to images, e.g., for visualization or debugging. Details of some examples are discussed herein with reference to operations 804-812 or 906-908.

In some examples, the vectors of the basis 506 correspond to significant, independent components common to the plurality of training images. The vectors of the basis 506 can be arranged in decreasing order of eigenvalue, variance, or another metric. The first vector in the arranged basis 506 can be the most significant contributor to the training images 502 overall, the second vector the next most significant, and so on. The computing system 120 can retain the highest-ranking n basis vectors, for predetermined n, or the basis vectors having eigenvalues or variances greater in magnitude than a predetermined threshold t. The basis vectors not selected can be discarded. The basis 506 can be or include the resulting reduced set of basis vectors, and can thus provide a compact representation of the vibrational characteristics of the test article. Each condition can be associated with a specific set of training images 502 and a specific basis 506 (or other reference non-image representation 128).

In some examples, the condition comprises a first sub-condition and a second sub-condition. In some of these examples, each sub-condition can be associated with respective, different training images 502 or other training data. In some of these examples, the basis 506 can be determined at operation 508 instead of operation 504. For example, the first sub-condition can be that the container is a cardboard box, and the second sub-condition can be that the item is a wine glass.

At 508, the computing system 120 determines the basis 506 based at least in part on first basis data associated with the first sub-condition and second basis data associated with the second sub-condition. For example, the first and second basis data can include respective basis vector sets of the respective sets of training images 502. The computing system 120 can determine the basis 506 including both the first and second basis data, or including the most significant basis vectors from each. Significance can be determined as described above.

In some examples, the training images 502 can include images representing multiple conditions having some overlap. For example, the image can represent the conditions "a cardboard box containing a fishbowl" and "a shelf containing a fishbowl." At operation 504 or 508, computing system 120 can determine condition-specific basis vector sets for the two conditions based on the respective images. Computing system 120 can then determine the basis 506 including basis vectors that are common to the two condition-specific basis vector sets. Continuing the example above, the basis 506 including the common basis vectors can represent the overlap between the two conditions, namely, "the contained item is a fishbowl." This can permit determining bases 506 for conditions for which training images 502 have not been collected or are not directly available. Basis vectors not common to the two condition-specific basis vector sets can represent non-overlapping portions of the condition (e.g., "cardboard box" vs. "shelf"), or coupling terms representing interactions between the cardboard box and the fishbowl, or between the shelf and the fishbowl.

In some examples, operation 504 or 508 can be repeated periodically, e.g., as additional training images 502 become available or as training images 502 are added or removed. Training images 502 can be added or removed, e.g., based on received customer feedback, as noted above, or based on changes to the material properties of an item that do not change the item's SKU or other identification. Examples of the latter changes can include a change by a book publisher from heavier paper in a first print run to lighter-weight paper in a second print run.

At 510, computing system 120 can determine the non-image representation 124 of the consolidated image 122 based at least in part on the basis 506 associated with the condition.

In some examples, the computing system 120 can reshape the consolidated image 122 from a matrix of pixel values to a vector of pixel values, e.g., in raster-scan order. The computing system 120 can then project the vector of pixel values to the basis 506. If the basis 506 is orthonormal, for example, the length of each projected component is the dot product of the original vector with the respective basis vector. The non-image representation 124 can be or include the coordinates of the vector in the basis 506.

In some examples, instead of or in addition to operations 504 or 508, the computing system 120 can retrieve basis 506, e.g., an orthogonal or orthonormal basis, from a database. The database can be keyed by expected types of item(s) 106, type of container, or a combination thereof. For example, a basis 506 can be associated with a condition such as "the container is a shelf and the shelf is holding a book and a CD," or "the container is a cardboard box holding a vase wrapped in bubble wrap."

At 512, computing system 120 can determine whether the non-image representation 124 satisfies the predetermined criterion associated with the condition. Details of some examples are discussed herein, e.g., with reference to operations 808-812. In examples using a vector projected onto a basis, the projected vector can be compared to the all-ones b-component vector $\vec{1} = (1, \ldots, 1)$, where b is the number of axes in the basis. For example, the distance between the projected vector and the vector $\vec{1}$ can be compared to a threshold or range. The non-image representation 124 can be determined to satisfy the predetermined criterion if the distance is above or below the threshold, or within or outside the range, according to predetermined data associated with the criterion.

At 514, computing system 120 can determine a computational model (CM) 516. The CM 516 can be associated with a training data set comprising a plurality of training consolidated images, e.g., reference images 126 or training images 502. In some examples, the CM 516 can include at least one of a neural network, a convolutional neural network, a decision tree, a random forest, a Bayesian classifier, or a support vector machine (SVM). The computing system 120 can determine the CM 516, e.g., using gradient-descent learning with backpropagation, gradient boosting, regression, or other supervised-learning techniques.

The determined CM 516 can take as input a consolidated image 122 (e.g., reshaped to a vector) or portion thereof. The determined CM 516 can additionally or alternatively take as input a non-image representation 124 or another representation of the consolidated image 122, e.g., coordinates in basis 506 of the consolidated image 122. The determined CM 516 can provide as output a flag 406 or other indication of whether the consolidated image 122 input to the CM 516 satisfies the condition associated with the training images 502 or a criterion associated with that condition.

In some examples, computing system 120 can train the CM 516 to indicate whether or not a consolidated image 122 satisfies a single condition. In some examples, computing system 120 can train the CM 516 to indicate which of several conditions a consolidated image 122 satisfies. For example, each training image 502 can be associated ("labeled") with a specific condition, and the computing system 120 can train the CM 516 as a classifier based on the labeled training images 502. Additionally or alternatively, the computing system 120 can train the CM 516 to receive a condition and to output a reference image 126 or reference non-image representation 128 of a test article satisfying that condition.

In some examples, each training image 502 can be labeled with physical properties of the test article depicted in that training image 502, e.g., mass, volume, density, shape, materials, or composition of items 106, packaging, containers, or other components of a test article. The computing system 120 can train the CM 516 to receive a consolidated image 122 and output physical properties exhibited by the test article represented by that consolidated image 122. The CM 516 can then be used to determine, e.g., whether a test article exhibits predetermined properties, e.g., a mass greater than the mass of the container alone, if an item should be present in the container. Additionally or alternatively, the computing system 120 can train the CM 516 to receive physical properties and to output a reference image 126 or reference non-image representation 128 of a test article exhibiting those properties or containing at least one item or container exhibiting those properties. Some examples can permit testing conditions based on combinations of materials represented in different training images 502.

In some examples, each training image 502 can be labeled with an indication of whether an item in the test article depicted in that training image 502 is damaged or intact, or whether that item is counterfeit or genuine. The computing system 120 can train the CM 516 to receive a consolidated image 122 and output an indication of whether an item in the test article represented by that consolidated image 122 is damaged, intact, counterfeit, genuine, or any combination of any of those. The CM 516 can then be used to, e.g., divert damaged or counterfeit items away from the main stream of processing, e.g., in an automated-warehouse environment. Additionally or alternatively, the computing system 120 can train the CM 516 to receive an identification of an item and its state (e.g., whether or not damaged or counterfeit, or how severely damaged) and to output a reference image 126 or reference non-image representation 128 of a test article including an item exhibiting that state.

In some examples, each training image 502 can be labeled with an indication of whether the test article depicted in that training image 502 includes properly packaged item(s), or at least one improperly packaged item. The computing system 120 can train the CM 516 to receive a consolidated image 122 and output an indication of whether at least one item in the test article represented by that consolidated image 122 is improperly packaged. The CM 516 can then be used to, e.g., validate packaging before items leave a packing station, e.g., in an automated-warehouse environment. Additionally or alternatively, the computing system 120 can train the CM 516 to receive an indication of at least one item and to output a reference image 126 or reference non-image representation 128 of a test article including those items, properly packed.

In some examples, the training images 502 can represent test articles that include items alone, or combinations of items. Each training image 502 can be labeled with indication(s) of the vibration(s) of item(s) represented in the training image 502. The indication(s) can be determined based on the image data of the reference images 126 and the frame rate of capture, e.g., as discussed herein with reference to lateral amplitude 314. The computing system 120 can train the CM 516 to receive a consolidated image 122 and output an indication of whether adding a particular item to the test article represented by that consolidated image 122 will change the vibrations or movement (increasing or decreasing) of item(s) already in the test article. This can permit, e.g., packaging a number of items into container(s) with reduced risk of damage to those items during shipping. Additionally or alternatively, the computing system 120 can train the CM 516 to receive an indication of at least one item and to output an indication of whether those items are likely to affect each other's vibration when packaged together in a container.

In some examples, each training image 502 can be labeled with an indication of an item 106 in the test article depicted in that training image 502, e.g., a stock-keeping unit (SKU), International Standard Book Number (ISBN), Universal Product Code (UPC), International Article Number (EAN), or Global Trade Item Number (GTIN) of the item 106. The computing system 120 can train the CM 516 to receive SKUs or other indications of at least one item 106 and output a reference image 126 or reference non-image representation 128 of a container holding the indicated at least one item 106. In some examples, this can permit testing simple identity conditions of items, e.g., conditions such as "this test article includes a copy of the hardcover three-volume War and Peace, ISBN 978-0679405733." This can additionally or alternatively permit testing for item combinations not present in the training images 502, e.g., "this test article includes CD X and book Y" based on training images 502 associated with CD X and other training images 502 associated with book Y.

In some examples, basis 506 or computational model 516 can be determined based at least in part on known physical properties of an object (e.g., materials, composition, or components). For example, a known natural frequency of vibration of an item can be converted to the image domain based on the frame rate, the size of the partial images 306, and the way partial images 306 are assembled to form the consolidated image 308.

At 518, the computing system 120 can operate the CM 516 based at least in part on the consolidated image 122. The CM 516 can provide data indicating whether the consolidated image 122 satisfies the predetermined criterion associated with the condition. Additionally or alternatively, the CM 516 can provide a non-image representation 124. In some examples of operation 518, the computing system 120 can determine an input to CM 516, e.g., of any of the types described above. The computing system 120 can then perform mathematical operations indicated by the CM 516, e.g., applying weights and activation functions in a neural network, convolving image data with filters in a convolutional neural network, or performing comparisons and tree traversal in a decision tree or forest.

Figure 6:
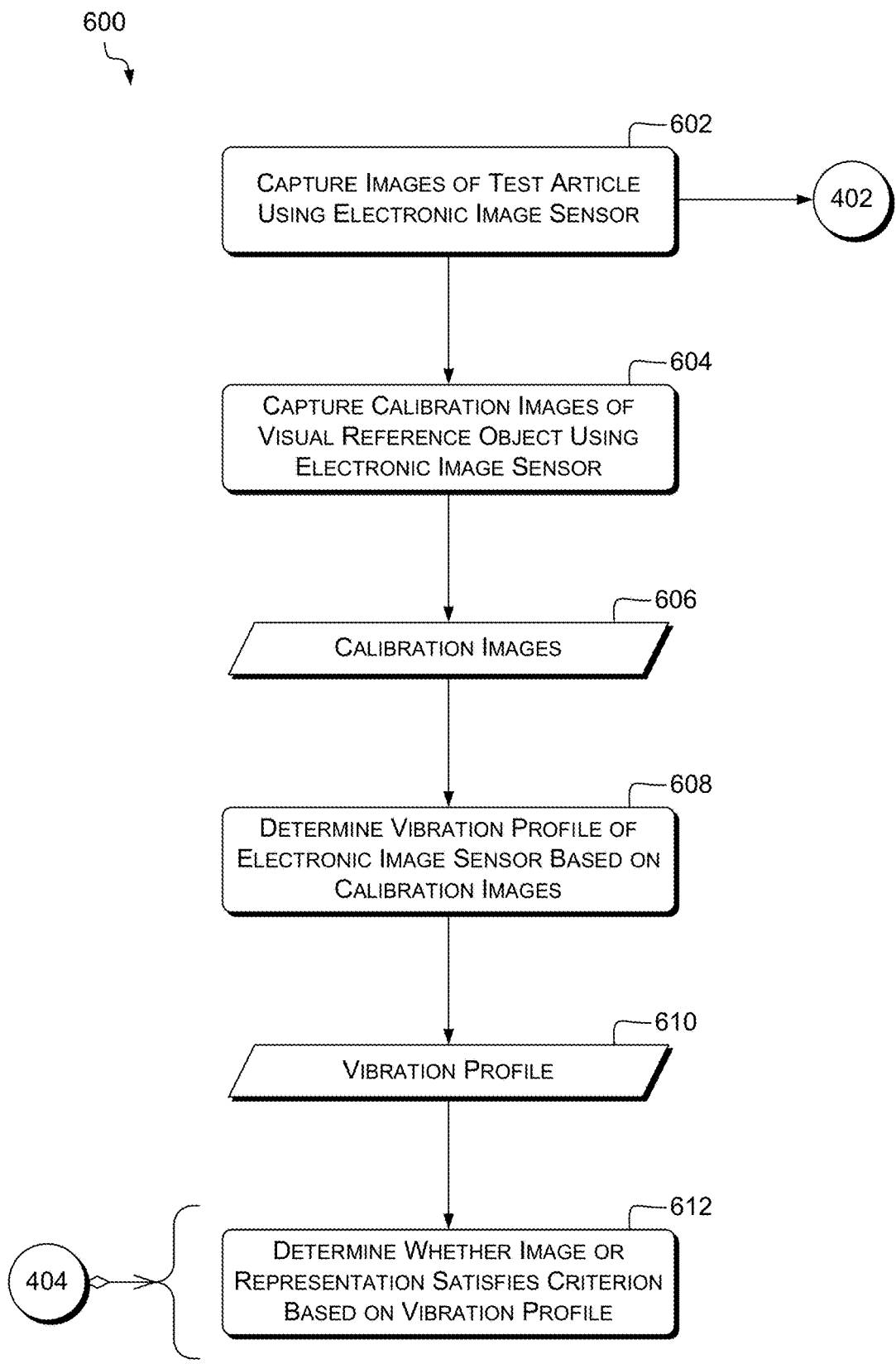
FIG. 6 is a dataflow diagram of an example process for determining calibration data and testing a condition of a test article based on the calibration data.

FIG. 6 is a flow diagram of an example process 600 for testing a condition of a test article, e.g., by determining calibration images, and shows related data items. In some examples, operation 404 can include operation 612.

At 602, the computing system 120 can successively capture individual images 112 of a plurality of images using an electronic image sensor 110. At least a portion of at least the container or an item 106 in the container can be imaged by the electronic image sensor 110 and depicted in at least one image 112. The images 112 can be or include, e.g., the full-frame images 302 ($I_j$) or partial images 306 ($P_{j,p}$) of FIG. 3, for multiple frames j=1, 2, . . . , J. In some examples described herein with reference to optics 238, operation 602 can include capturing the individual images using the pixels of a common capture region of an electronic image sensor 110. The electronic camera 108 can have a frame rate of at least 60 frames per second or other rates discussed above. Operation 602 can be followed by operation 402 or operation 604.

The image capture can be directed by the computing system 120, the electronic image sensor 110 or electronic camera 108, or another capture-control device, e.g., having components described with reference to FIG. 2. As noted above with reference to FIG. 3, edges of the test article or the container can be detected and partial images 306 can be arranged with respect to those edges.

At 604, the computing system 120 can capture a plurality of calibration images 606 of a visual reference object using the electronic image sensor 110. The term "visual" is not limited to human-visible. For example, a reference object can be visible in infrared wavelengths to an infrared electronic image sensor 110. An example visual reference object is object 246, FIG. 2. In some examples, the visual reference object can be an empty container of a predetermined type. For example, in use cases testing the contents of pods, an empty pod can be the visual reference object. In some examples, at least some of, or all of, the calibration images 606 can be stripe images. In some examples, at least some of, or all of, the calibration images 606 can be full-frame images from an area sensor, or other images that are not stripe images.

At 608, the computing system 120 can determine a vibration profile 610 associated with the electronic image sensor 110 based at least in part on the plurality of calibration images 606. In some examples, the computing system 120 can generate consolidated images 122 and non-image representations 124 as described herein. For example, the vibration profile 610 can be or include a basis representing significant components in the vibration in the calibration images 606, e.g., a PCA or other eigenvalue decomposition such as those described herein with reference to operations 504 or 508 or basis 506. The vibration profile 610 can additionally or alternatively comprise projections of principal components in the camera vibration onto the basis 506.

In some examples, the calibration images 606 can additionally or alternatively be used to compensate for differences between cameras. In some examples, two different electronic cameras 108 can produce different consolidated images 122 for the same test article. The differences can be in, e.g., absolute level, dynamic range (contrast sensitivity), tonescale, resolution, color balance (e.g., due to differences in primary chromaticities or white point), or other differences. At operation 608, the computing system 120 can adjust for differences between two cameras based on calibration images 606, e.g., by normalizing. In some of these examples, calibration images 606 of a particular visual reference object are available for both cameras. This can permit testing conditions of images 112 captured using a first camera with respect to reference images 126 captured using a second, different camera.

In some examples, operation 608 can include determining temporal frequency components visible in or represented by image content of the calibration images 606. For example, an empty container 242 may vibrate at certain frequencies, e.g., its natural frequency and harmonics. Similarly, a camera 108 viewing a visual reference pattern 248 may vibrate at certain frequencies, which will appear as vibrations of the stationary visual reference pattern 248 even though the vibrations are actually occurring in the camera 108. Operation 608 can include performing a Fourier, wavelet, or other transformation into the frequency domain. The transformation can be performed on individual calibration images 606, groups of calibration images 606, or consolidated images 122. Operation 608 can include determining frequencies or frequency bands having at least a predetermined energy in the calibration images 606. Operation 608 can include storing information of those frequencies or bands in the vibration profile 610.

At 612, the computing system 120 can determine whether the consolidated image 122 satisfies the predetermined criterion associated with the condition further based at least in part on the vibration profile 610. In an example in which the vibration profile 610 comprises projections onto the basis 506, the computing system 120 can subtract the vibration profile 610 from the non-image representation 124 of the consolidated image 122 to provide an adjusted non-image representation. The computing system 120 can then test the adjusted non-image representation against the criterion using any of the techniques described herein, e.g., distance thresholds or computational-model evaluation (CM 516).

In some examples using temporal frequency components as described above, operation 612 can include subtracting, masking off, or filtering out frequencies or bands indicated in the vibration profile 610 as being associated with, e.g., a camera 108 or a container 242. For example, if the camera 108 vibrates at 1 kHz, the band 1 kHz±5% or ±10% can be disregarded in determining, or removed before determining, whether the consolidated image 122 satisfies the predetermined criterion. This can permit determining the frequency dynamics of items in a container 242 separately from the container 242, and likewise for camera 108.

Figure 7:
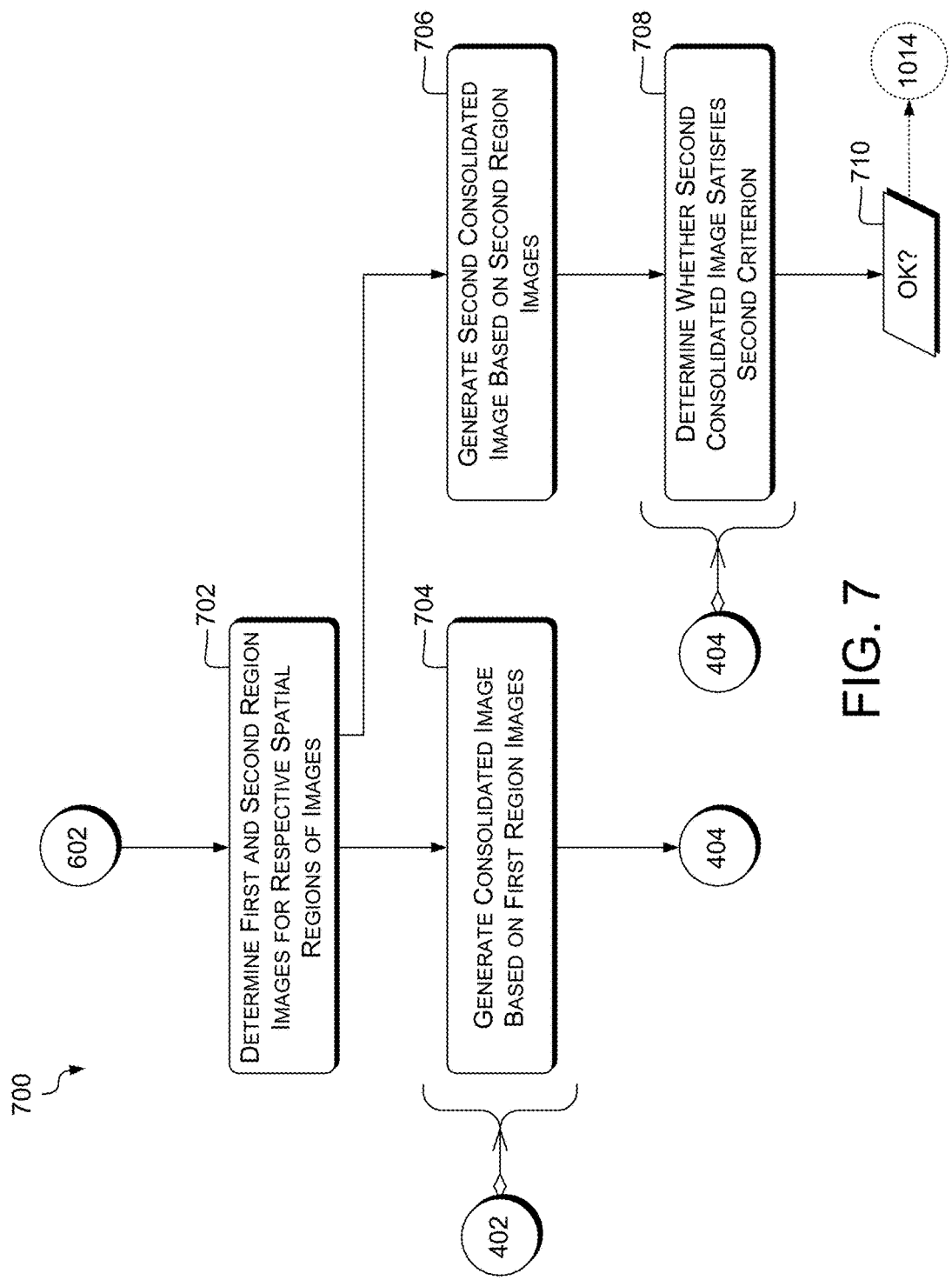
FIG. 7 is a dataflow diagram of an example process for testing a condition of a test article using region images.

FIG. 7 is a flow diagram of an example process 700 for testing a condition of an item in a container, e.g., using region images associated with particular spatial regions, and shows related data items. Process 700 can be used, e.g., with captured image 302 or other captured images 112 including image data associated with a plurality of items 106 or a plurality of containers. In some examples, operation 602 can be followed by operation 702. Operation 402 can include operations 704 or 706. Operation 704 can be followed by operation 404. Operation 404 can include operation 708. In some examples, process 700 can be used with assemblies or collections of multiple test articles, e.g., a pod 102 or a pallet containing multiple boxes.

At 702, the computing system 120 can determine first region images and second region images based at least in part on the individual captured images 112. The first region images can correspond to a first spatial region of the individual images 112, e.g., a first common capture region or pixel set $S_1$ (FIG. 3), and the second region images can correspond to a second, different spatial region of the individual images 112, e.g., a second, different common capture region or pixel set 52. In some examples, the first and second partial images can include respective subsets of a particular common capture region or pixel set, e.g., just as regions 316(1) and 316(2) include subsets of partial image 306(4). In some examples, each region image can be a partial image 306 or a portion thereof. For example, the first region images can be, e.g., $P_{j,1}$ or regions 316(1) in the notation of FIG. 3, and the second region images can be, e.g., $P_{j,2}$ or regions 316(2).

In some examples, the spatial regions can be determined based on the type of container or assembly. For example, based on prior knowledge that the container is a pod, pallet, bin with dividers, multi-compartment tray, or other type of container, an appropriate arrangement of spatial regions can be retrieved from a database. In some examples, the spatial regions can be determined using image recognition, e.g., to detect boundaries or other features of the assembly or individual containers therein, or barcodes or other fiducials on or in the assembly or individual containers therein.

At 704, the computing system 120 can generate the consolidated image based at least in part on the first region images, e.g., using techniques described herein with reference to FIGS. 1-4.

At 706, the computing system 120 can generate a second consolidated image based at least in part on the second region images, e.g., using techniques described herein with reference to FIGS. 1-4. In some examples, the consolidated image can represent one shelf of a pod and the second consolidated image can represent another shelf of that pod.

At 708, the computing system 120 can determine whether the second consolidated image satisfies a second predetermined criterion. The second predetermined criterion can be associated with the same condition as the predetermined criterion, or with a different condition. The second predetermined criterion can be the same as the predetermined criterion of operation 404, or can be different. The computing system 120 can provide flag 710 carrying an indication of whether the second consolidated image satisfies the second predetermined criterion. Flag 710 can be, e.g., as discussed herein with reference to flag 406. Various examples of process 700 thus permit individually testing several conditions of multiple test articles depicted in a single captured image 112, or testing complex conditions not representable using a single criterion. In some examples, operation 708 can be followed by operation 1014, FIG. 10.

Figure 8:
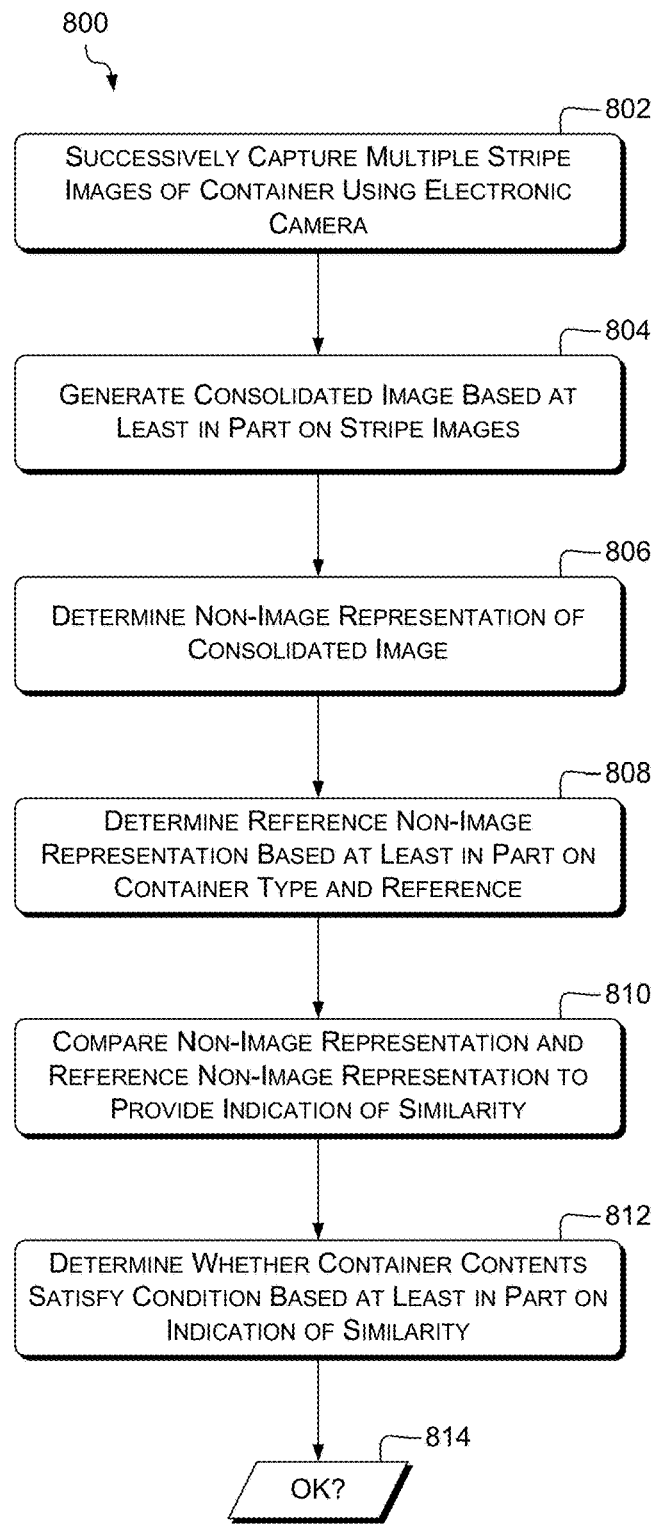
FIG. 8 is a dataflow diagram of an example process for testing a condition of an item in a container using non-image representations.

FIG. 8 is a flow diagram of an example process 800 for testing a condition of an item in a container, and shows related data items. In some examples, operations of process 800 can be used to verify the contents of a container.

At 802, the electronic camera 108 can successively capture multiple stripe images 112, e.g., using a common capture region of the electronic camera 108. Examples are discussed herein, e.g., with reference to operation 602. For example, operation 802 can include successively capturing the multiple stripe images 112 using the electronic camera 108 operating at a frame rate of at least 60 fps.

In some examples, the multiple stripe images 112 can be, or be determined from, consecutive frames provided by the electronic camera 108. In the example of FIG. 3, stripe images $P_{1,4}$, $P_{2,4}$, and $P_{3,4}$ can correspond to respective frames of three consecutive frames captured by the electronic camera 108. This can permit reducing the time required to capture data of a test article 244. In an automated-warehouse environment, for example, this can increase the throughput of systems within the warehouse. Using consecutive frames can also provide a consistent time base, which can improve the accuracy of the data and can permit collecting data without lasers or other external position or timing sensors. Using consecutive frames can also permit collecting data at various frame rates, e.g., using adjustable-frame-rate electronic image sensors 110. This can permit collecting and using data at the particular frame rate that most clearly evidences whether a particular condition is satisfied.

The common capture region can include, e.g., a specific set of pixels used in capturing each of the multiple stripe images, or from which the multiple stripe images can be determined by interpolation. A view volume of the common capture region, e.g., view volume 114, can include at least part of the container or at least part of an item 106 (or items) in the container. Accordingly, the common capture region of the electronic camera 108 can image at least part of the container or item 106, or at least part of the container and at least part of an item 106. Furthermore, in some examples, the image data of at least some of the images 112 can include images of at least part of the container or at least part of one or more item(s) 106 in the container.

At 804, the computing system 120 can generate a consolidated image 122 based at least in part on the multiple stripe images 112. Examples are discussed herein, e.g., with reference to FIG. 1 or 3, or operation 402

At 806, the computing system 120 can determine a non-image representation of the consolidated image 122. Details of some examples as discussed herein with reference to operations 510 or 518. In some examples, the non-image representation 124 can include or represent, e.g., spatial-frequency terms in the consolidated image 122 such as those determined by a Fourier transform. In some examples, the non-image representation 124 can be or include coordinates of the vectorized consolidated image 122 in a basis 506.

In some examples, feature-extraction or -representation techniques can be applied to the consolidated image 122 to determine the non-image representation 124. Example techniques can include Fourier transformation, scale-invariant feature transformation (SIFT), histogram of oriented gradients (HoG) determination, or detection of edges using Canny or algorithms. Example features in non-image representation 124 can include edge locations, statistics of the image, characteristic frequencies, or other features provided by techniques such as those noted above.

At 808, the computing system 120 can determine a reference non-image representation 128 based at least in part on a type of the container. The reference non-image representation 128 can be determined using any of the techniques described herein with reference to the non-image representation 124. For example, the reference non-image representation 128 can include coordinates of a vectorized reference image 126 in a basis 506. The reference non-image representation 128 can be associated with at least one of the condition, the container, or an item.

In some examples, the reference non-image representation 128 can be associated with reference contents of the container. For example, at operation 808, the computing system 120 can retrieve, from an inventory system, identit(ies) of item(s) in the reference contents, e.g., item(s) expected to be in the container. The computing system 120 can then determine the reference non-image representation 128 further based on the retrieved identit(ies), e.g., by retrieving the reference non-image representation 128 from a database indexed by the identit(ies).

In an example, the condition may be that the item is a paperback book. The vibrations of a paperback book on a shelf may be very different from the vibrations of a paperback book in a cardboard box. Therefore, operation 808 can include determining a different reference non-image representation 128 if the container is a shelf than if the container is a cardboard box.

In another example, the vibrations of a paperback book on a shelf may be very different from the vibrations of a teddy bear on a shelf. Operation 808 can include determining respective, different reference non-image representations 128 for those conditions, even when the container is the same.

At 810, the computing system 120 can compare the non-image representation 124 with the reference non-image representation 128 to provide an indication of similarity. For example, the non-image representation 124 and the reference non-image representation 128 can be or include respective vectors, e.g., of coordinates, extracted features, or other data. The computing system 120 can compute a vector distance, dot product, difference of magnitudes, or other distance between those vectors. The specific type of distance computed can be determined based at least in part on the expected type of item 106 or container.

At 812, the computing system 120 can determine whether the item 106 satisfies the condition based at least in part on the indication of similarity. For example, the computing system 120 can determine that the item satisfies the condition if the computed distance from operation 810 is below a predetermined threshold. The predetermined threshold can be determined based at least in part on the expected type of item 106 or container. Operation 812 can provide data indicating whether the item satisfies the condition. In FIG. 8, that data is depicted as "OK?" flag 814. The predetermined threshold can be an example of a criterion as described herein.

In some examples, at operation 812, the computing system 120 can determine whether contents of the container, e.g., item(s) 106 in the container (if any), correspond to reference contents of the container based at least in part on the indication of similarity. Reference contents of the container can be used in determining the reference non-image representation 128, e.g., as discussed herein with reference to operation 808. Therefore, if the non-image representation 124 sufficiently corresponds to the reference non-image representation 128, as indicated by the indication of similarity, the computing system 120 can determine that the imaged container has the reference contents. Reference contents can be relatively more specific or relatively more general, in some examples. For example, reference contents can specify that the container should hold a certain number of items, items in particular formats (e.g., paperback, hardcover, or DVD), specific items, or any combination thereof. In some examples, at operation 812, the computing system 120 can determine that a container that should be empty includes at least one item 106, or that a container that should include at least one item 106 is empty.

Figure 9:
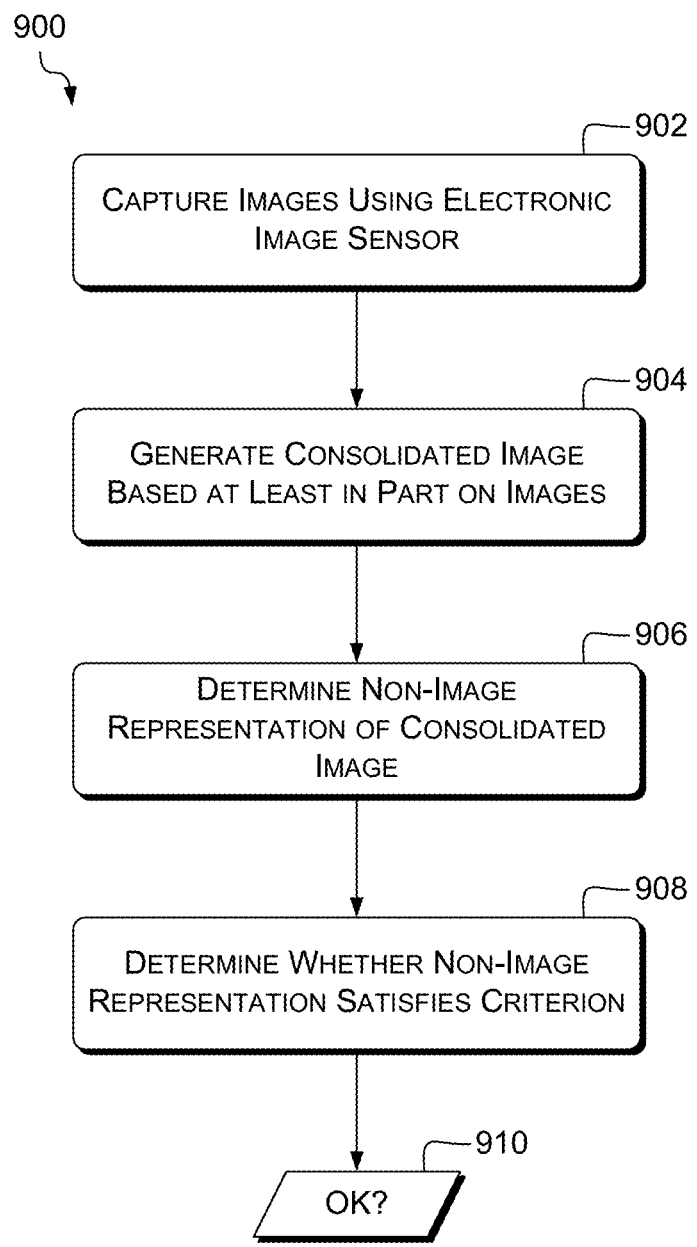
FIG. 9 is a dataflow diagram of an example process for testing a condition of a test article using a non-image representation.

FIG. 9 is a flow diagram of an example process 900 for testing conditions of test articles, and also shows some related data items. Process 900 can be carried out by a system comprising or in communication with an electronic image sensor 110, e.g., a computing system 120 or other system as discussed herein with reference to FIG. 1 or 2. For clarity of explanation, and without limitation, reference is made to the image configuration of FIG. 3.

At 902, the computing system 120 can capture, or cause to be captured, individual images 112 of a plurality of images of the test article, using the electronic image sensor 110. As discussed herein with reference to operation 602 or 802, the images 112 can be images of containers, items 106, or portions of either of those. The images 112 can be captured successively. Examples are discussed herein, e.g., with reference to image set 300 or to operations 602 or 802.

At 904, the computing system 120 can generate a consolidated image 122 based at least in part on the plurality of images, e.g., based at least in part on at least some images 112 of the plurality of images. Examples are discussed herein, e.g., with reference to consolidated image 308(4) or operations 402 or 804.

At 906, the computing system 120 can determine a non-image representation 124 of the consolidated image 122. The non-image representation 124 can include, e.g., coordinates or another non-image representation, as discussed herein, e.g., with reference to FIG. 5 or operation 806.

At 908, the computing system 120 can determine whether the non-image representation 124 satisfies a predetermined criterion associated with the condition, e.g., similarity with a reference non-image representation 128. Examples are discussed herein, e.g., with reference to operations 512, 810, or 812. Operation 908 can provide flag 910, e.g., as discussed herein with reference to with reference to flag 814. In some examples, operation 908 can include operation 612. In some examples, operation 908 can be followed by operation 1014, FIG. 10.

In some examples using projection into a basis 506, the basis 506 can represent principal components that should be evidenced by a test article satisfying the condition. In some of these examples, the reference non-image representation 128 can be the vector 1, discussed above.

In some examples using projection onto a basis 506, the criterion can be a magnitude or direction of the projected vector being greater than, less than, or substantially equal to a predetermined value, or within or outside a predetermined range. In some examples in which the reference non-image representation 128 is a vector, the criterion can be a distance between the non-image representation 124 and the reference non-image representation 128 having a magnitude or direction being greater than, less than, or substantially equal to a predetermined value, or within or outside a predetermined range.

Figure 10:
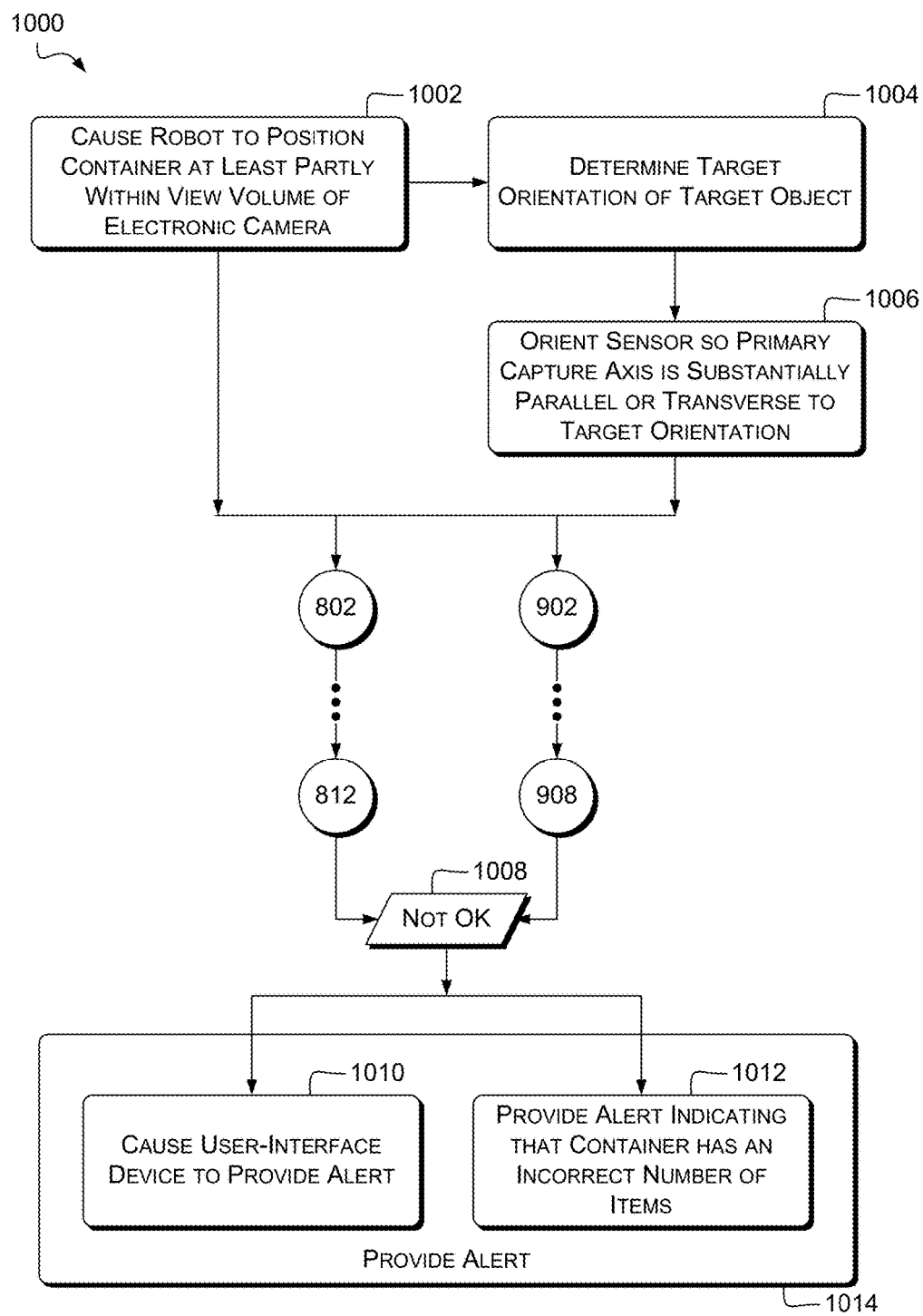
FIG. 10 is a dataflow diagram of an example process for testing a condition of a test article in a workflow.

FIG. 10 is a flow diagram of an example process 1000 for testing conditions of a test article, e.g., in a workflow such as an order fulfillment workflow, and also shows some related data items. Operation 1002 can be followed by operation 802, FIG. 8, or operation 902, FIG. 9, or by operation 1004. Operation 812, FIG. 8, or operation 908, FIG. 9, can be followed by operation 1010. In some examples, operation 1004 can be used independently of operation 1002.

In some examples, as discussed herein with reference to FIG. 2-4 or 7, the electronic image sensor comprises pixels of a common capture region and pixels outside the common capture region, and the pixels of the common capture region are arranged substantially along a primary capture axis. In some of these examples, the system also includes a motorized mount 236, FIG. 2, retaining the electronic image sensor 110. In some of these examples, operations 1004 and 1006 can be followed by operations 802 or 902.

At 1002, before capturing the multiple stripe images 112 at operation 802, or before determining the target orientation at operation 1004, the computing system 120 can cause a robot 116 (or other motion system, and likewise throughout the discussion of this figure) to position a test article, or an item 106 or container thereof, at least partly within the view volume 114. For example, in an automated warehouse, the computing system 120 or another inventory controller may provide instructions via a wireless network to cause the robot 116 to go to a location in the warehouse, pick up a pod 102, and deliver the pod 102 to an imaging station including an electronic camera 108.

Operation 1002 can permit testing conditions of items in an automated manner, e.g., at a test station in an automated warehouse. For example, computing system 120 can direct a robot 116 to bring a specific pod 102 to a test station including the electronic camera 108. Computing system 120 can then cause images 112 to be captured, and can analyze those images as discussed herein. In some examples, pods 102 can be tested in a predetermined order or when not otherwise in use, so that each pod 102 is tested substantially on a predetermined schedule or within a predetermined time interval.

At 1004, the computing system 120 can determine a target orientation of a target object at least partly within the view volume 114 of the electronic image sensor 110. The target object can include, e.g., a test article, an item 106, or a container. Operation 1004 can include determining the target orientation by processing captured images 112 using operations such as those discussed below with reference to operation 906. Operation 1004 can additionally or alternatively include determining the target orientation by measuring the target object using a sensor, e.g., a range sensor, laser grid, mechanical probe, or other sensor. For example, the target orientation can be the major axis of a best-fit ellipsoid of the target object or its representation in the captured images 112. In some examples using both operation 1002 and operation 1004, the computing system 120 can retrieve information about the target orientation from the robot 116.

At 1006, the computing system 120 can cause the motorized mount 236 to orient the electronic image sensor 110 based at least in part on the target orientation so that the primary capture axis is aligned either substantially parallel to or substantially transverse to the target orientation, e.g., within ±5° or ±10° of parallel or transverse.

In some examples, operation 812 or operation 908 may provide flag 1008 indicating that the item 106 under test does not satisfy the condition ("Not OK"). Flag 1008 can represent flag 814 or 910. In some of these examples, operation 812 or operation 908 can be followed by operation 1010.

At 1010, in response to flag 1008, or otherwise in response to a determination at operation 812 or operation 908 that the item 106 does not satisfy the condition or at operation 908 that the test article does not satisfy the condition, the computing system 120 can cause a user-interface device 132 to provide an alert. The user-interface device 132 can include, e.g., a display 228, a printer, audio speakers, beepers, and/or other audio result devices, a vibration motor, linear vibrator, and/or other haptic result device, or other devices for presenting information to a user. The alert can include, e.g., a visual, auditory, haptic, or multimodal indication that the item does not satisfy the condition. Example alerts can include a yellow, orange, or red warning light; a beep or buzz; or a vibration from a user's smartphone or pager.

Figure 12:
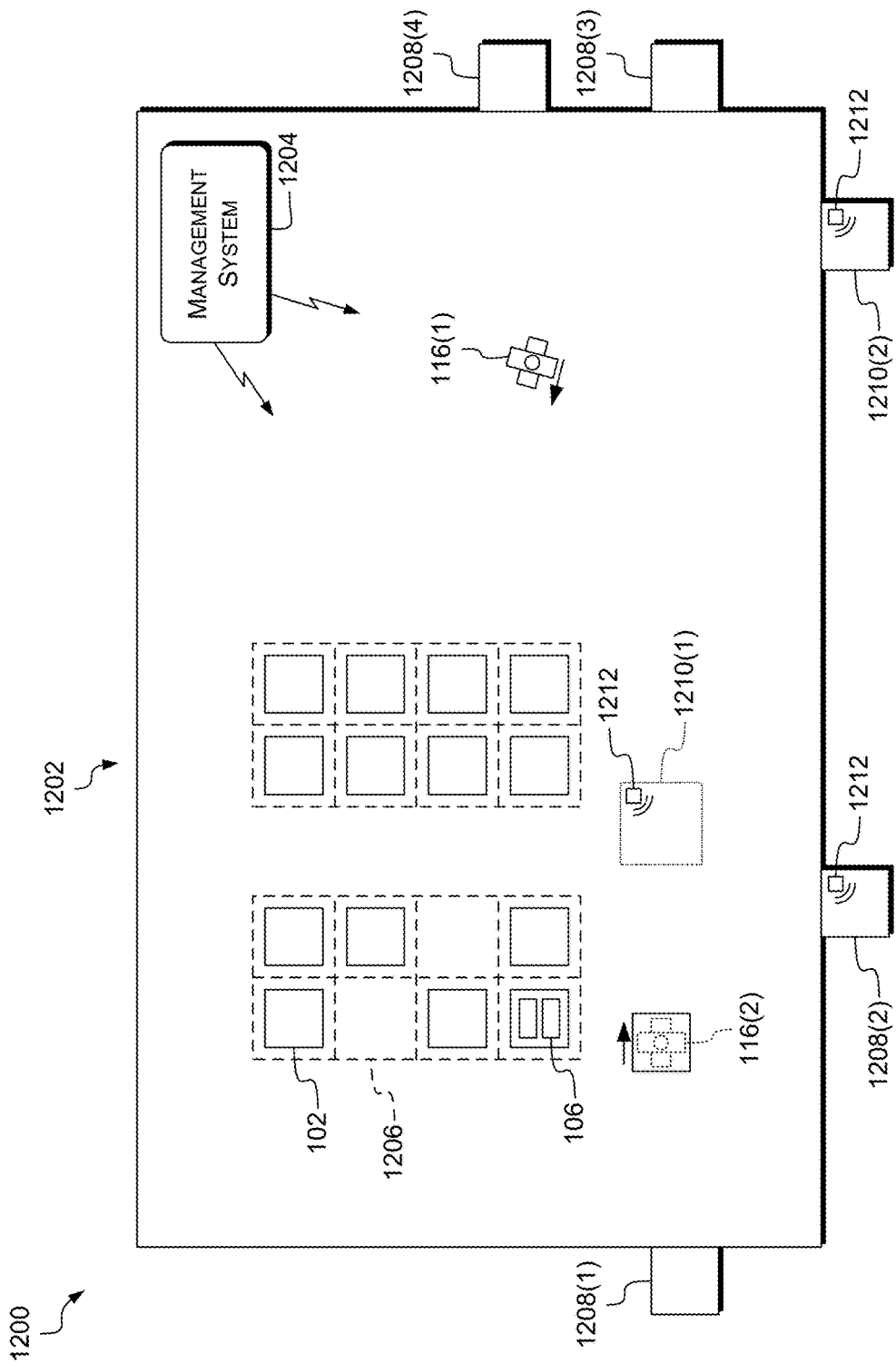
FIG. 12 is a schematic plan view that depicts components of an example inventory control system configured to test conditions of test articles.

At 1012, in response to flag 1008, or otherwise in response to a determination at operation 812 or operation 908 that the item 106 does not satisfy the condition or that the contents of the container do not correspond to the reference contents of the container, or at operation 908 that the test article does not satisfy the condition, the computing system 120 can provide an alert indicating that the container has an incorrect number of items. Operation 1012 can be used, e.g., when the reference contents comprise a predetermined number of items. The alert can be presented, e.g., via user-interface device 132, or via a network 224 to a management system such as management system 1204 (FIG. 12). In some examples, the alert can comprise a request or order that items in the container be recounted, or that the container be moved by a motion system such as robot 116 to a location where the contents of the container can be checked using other techniques.

Operations 1010 and 1012 can be examples of operation 1014. At 1014, the computing system 120 can provide an alert, e.g., in response to the non-image representation 124 failing to satisfy a predetermined criterion. E.g., in an automated-warehouse environment, the alert can cause an item to remain at a station rather than moving on, or to be diverted out of a process flow to a holding or corrective-action area.

In some examples, the alert can comprise a visual, auditory, or other human-perceptible presentation of at least some of the intended or desired inventory of items in a test article 244. Operation 1014 can include presenting the alert via a user-interface device 132. For example, if a test article 244 should include four items but only includes two, the alert can include a display of the two missing items, or of the four items that should be present. This can permit more rapidly correcting inventory faults, e.g., in a warehouse environment.

In some examples, the alert can comprise a machine-readable message, e.g., expressed in the Simple Network Management Protocol (SNMP) or another protocol, indicating the existence or nature of an inventory fault. Operation 1014 can include transmitting the alert, e.g., via a network. In response to the alert, a processor e.g., of management system 1204 (FIG. 12), can log the inventory fault, increment an inventory-fault counter, or take other actions to record the fact of the inventory fault or to provide for immediate or later correction of the inventory fault. For example, the management system 1204 can record an identity of the container having the inventory fault so that the container can be checked at the next work station it reaches.

Figure 11:
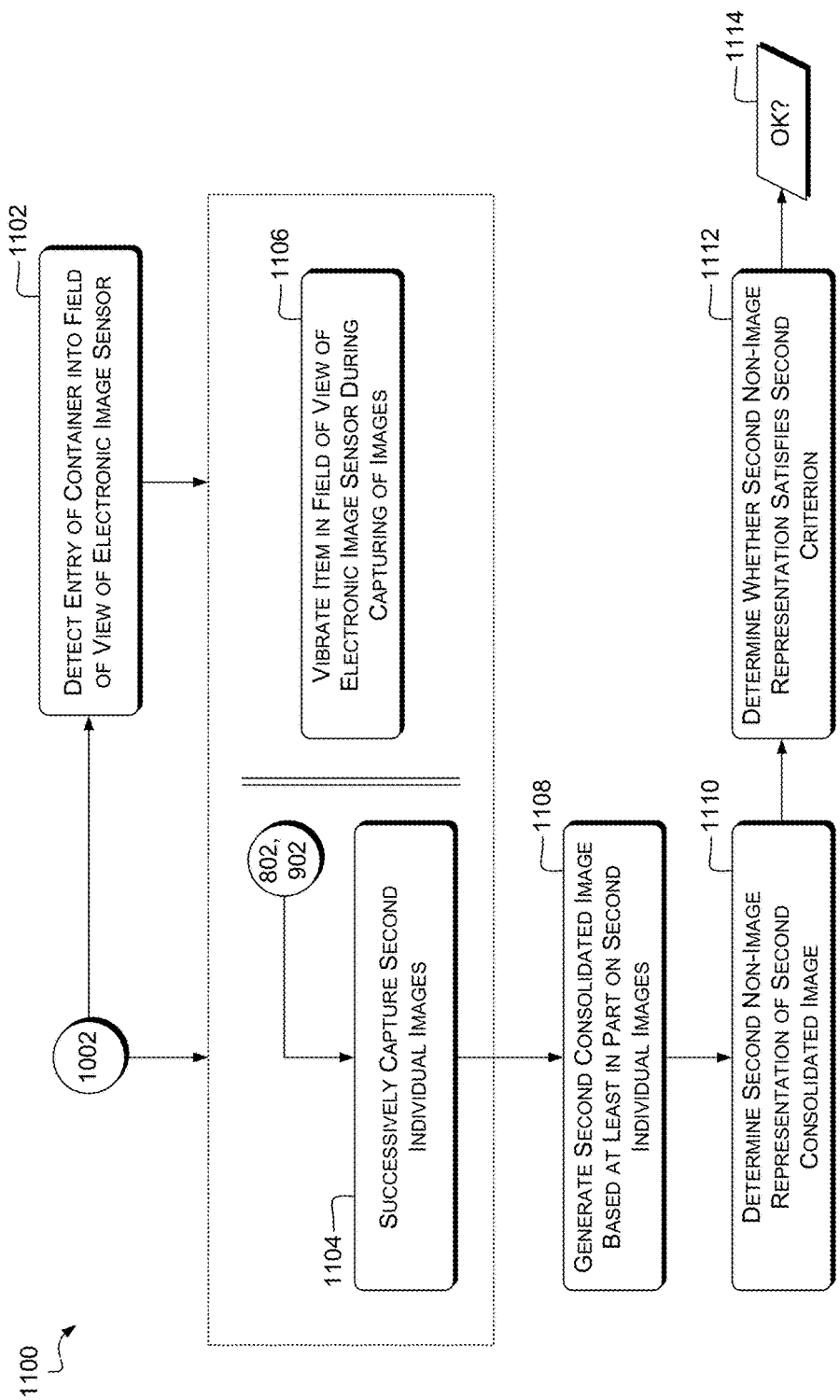
FIG. 11 is a dataflow diagram of an example process for testing a condition of a test article in an example automated item-handling environment.

FIG. 11 is a flow diagram of example processes 1100 for testing conditions of a test article in a warehouse or other automated item-handling facility or environment. In some examples, a computing system 120 carrying out operations of FIG. 8 or 9 can be communicatively connectable with a motion system, e.g., robot 116.

In some examples, operation 1002 can be followed by operation 1102. This can provide, e.g., positive control of the items, by directing the positioning of the item (operation 1002) and then verifying that the positioning has occurred (operation 1102, discussed below). In some examples, operations 1002 or 1102 can be followed by at least one of operations 802, 902, 1104, or 1106.

In some examples, system 100 includes a second electronic image sensor, e.g., as discussed herein with reference to electronic image sensor 110 or partial images 306. In some of these examples, any of operations 802, 902, 1002, or 1102 can be followed by operation 1104.

At 1102, the computing system 120 can detect entry of a test article, e.g., a container, at least partly into a view volume 114 of the electronic image sensor 110. For example, the computing system 120 can detect entry of a container at least partly into the view volume 114 associated with the common capture region of electronic camera 108, as discussed herein with reference to FIG. 3.

In some examples, the individual images 112, e.g., multiple stripe images, can be captured (operation 802 or 902) subsequent to, or in response to, the detection at operation 1102. Examples of detection of test articles are discussed herein with reference to FIG. 2.

In some examples, system 100 can include an object sensor 250 configured to detect the container in the view volume of the electronic image sensor 110. For example, the object sensor 250 can include a range sensor, such as a laser rangefinder or sonar sensor, configured to detect that an object is present within the view volume (e.g., view volume 114). In these examples, operation 1102 can include detecting the entry of the container using the object sensor 250. Examples are discussed herein, e.g., with reference to object sensor 250, FIG. 2.

Additionally or alternatively, a change in image data output by the electronic image sensor 110 can be detected. In an example, a test station in a warehouse can include a fixed background, e.g., of a predetermined color or pattern, within the view volume. The fixed background can be or include a visual reference object 246 or visual reference pattern 248. When a container is interposed between the fixed background and the electronic image sensor 110, the pixel values being output by the electronic image sensor 110 can change. In some examples, operation 1102 can include detecting these changes, e.g., as changes in statistical properties of the pixel values (e.g., mean, min, max, or standard deviation) beyond a predetermined threshold. Examples are discussed herein, e.g., with reference to visual reference object 246, FIG. 2.

At 1104, the electronic camera 108 can capture second individual images of a second plurality of images using a second electronic image sensor. For example, the second images can be captured successively. In some examples, computing system 120 can capture first partial images 306(p) at operation 902 and second partial images 306(r) at operation 1104, where p≠r.

At 1106, the computing system 120 can cause a vibratory actuator 118 to vibrate a test article, e.g., including an item 106, in a view volume of the electronic image sensor 110, e.g., view volume 114, during the capturing of the individual images 112. Operation 1106 can be conducted in parallel with at least one of operation 902 or operation 1104, as indicated by the parallel vertical lines. Operation 1106 can include vibrating an item 106 directly, or vibrating a container of the item 106, e.g., pod 102 or shelf 104. Applying known vibration using vibratory actuator 118 can permit more accurately detecting small variations in vibrational behavior of a test article, since variations in the consolidated image 122 are less likely to be due to vibration-source variations than in examples not using a vibratory actuator 118. In some examples, operation 1106 can be followed by operation 1110. In some examples, operation 1106 can include sweeping frequencies or amplitudes of vibration, e.g., continuously or between image captures. This can permit testing for resonance of a test article 244 with particular frequencies or other conditions of vibration, which can improve the signal-to-noise ratio of vibration detection. In some examples, multiple images 112 are collected at each of several different vibration frequencies.

At 1108, the computing system 120 can generate a second consolidated image based at least in part on the second plurality of images. This can be done as discussed herein with reference to consolidated images 122, 126, or 308, or operations 402, 804, or 904.

At 1110, the computing system 120 can determine a second non-image representation of the second consolidated image. This can be done as discussed herein with reference to non-image representations 124 or 128, or operations 806, 810, or 906.

At 1112, the computing system 120 can determine whether the second non-image representation satisfies a second predetermined criterion associated with the condition or a second, different condition. This can be done as discussed herein with reference to operations 810, 812, or 908. The computing system can provide flag 1114, which can represent flag 814, 910, or 1008.

In some examples, the second criterion can be the same as the first criterion, or different from the first criterion. Testing criteria using first and second images can permit testing multiple criteria in parallel, testing a test article with respect to multiple camera angles or frame rates, or otherwise improving the speed or accuracy of condition testing.

Illustrative Environments

FIG. 12 is a schematic plan view of an example inventory control system 1200, depicted for clarity as an automated warehouse 1202. For brevity and clarity of the drawing, not every individual component is labeled.

A management system 1204 can assign tasks to components of (or in, and likewise throughout the discussion of this figure) the inventory control system 1200 and coordinate operation of the various components in completing the tasks. These tasks may relate both to the movement and processing of items 106 and the management and maintenance of the components of the inventory control system 1200. In some examples, functions described herein of management system 1204 can be performed in a distributed manner, e.g., via peer-to-peer communication among components of the inventory control system 1200.

Robots 116(1) and 116(2), or other motion systems, can transport pods 102 or other containers between points within the warehouse 1202 on their own, or in response to commands communicated, e.g., via a wired or wireless network, by the management system 1204. The illustrated bent arrows represent wireless links between management system 1204 and robots 116. Robot 116(2) is shown as carrying a pod 102. Each pod 102 or other container can hold one or more items 106 of the same type or of different types. In some examples, each pod 102 has a respective home location 1206.

The inventory control system 1200 can include one or more work stations 1208, e.g., configured for processing inventory. The management system 1204 can direct movement of items 106 between work stations 1208, or other locations within the warehouse 1202, e.g., to facilitate the entry, processing, and/or removal of items 106 from inventory control system 1200 and the completion of other tasks involving the items 106. The work stations 1208 may represent both the physical location and also any appropriate equipment for processing or handling items, such as work benches, packing tools and supplies, scanners for monitoring the flow of items in and out of inventory control system 1200, communication interfaces for communicating with management system 1204, or any other suitable components. Work stations 1208 may be controlled, entirely or in part, by human operators, or may be partially or fully automated.

Tasks performed at work stations 1208 may include the unloading of pallets or other containers from trucks or other vehicles, the removal of items 106 from containers, the unpacking of items 106 (e.g. from pallet- or case-sized groups to individual items), the inspection of items 106 to determine their state, the addition, or restocking, of items 106 into containers, the counting of items 106, the consolidation of items 106 between containers, the packing of multiple items 106 into a container to complete an order, the loading of packed containers into a shipping vehicle, or the processing or handling of items 106 in any other suitable manner.

At least some of the work stations 1208, or dedicated imaging stations 1210, can include imaging systems 1212. Imaging systems 1212 can include components described herein with reference to FIG. 1 or 2. For example, an individual imaging system 1212 can include an electronic camera 108 or a computing system 120 configured to test conditions of items 106 at the work station 1208 or imaging station 1210 including the imaging system 1212.

Additionally or alternatively, the management system 1204 can include or be communicatively connected with a computing system 120 configured to process data provided by electronic cameras 108 of imaging systems 1212. In some example, the management system 1204 can retrieve inventory or expected-inventory data for work stations 1208 or imaging stations 1210. The management system 1204 can then determine bases associated with the retrieved data, e.g., as discussed herein with reference to basis 506, FIG. 5, or operations 806, 808, or 906. The management system 1204 can transmit the bases to imaging systems 1212 or can receive consolidated images 122 from imaging systems 1212 and process those consolidated images 122 using the bases, in some examples.

In the illustrated example, imaging station 1210(1) is configured to test conditions of items in containers as they pass through en route to a work station 1208. Imaging station 1210(2) is configured to test conditions of items in containers as a dedicated operation. Work station 1208(2) includes an imaging system 1212 configured to test conditions of items, e.g., entering or leaving work station 1208(2). In some examples, activities at work station 1208(2) may commence only upon receipt of an item satisfying a condition, e.g., that the correct item or item type is present. In some examples, activities at work station 1208(2) may not be considered complete until an item at the work station 1208(2) satisfies a condition, e.g., that an item is packed properly within its container.

In some examples, imaging systems 1212 can be positioned in or near home locations 1206 and configured to image pods 102 as the pods 102 move around the warehouse 1202. In some examples, imaging stations such as imaging station 1210(1) can be placed in areas frequented by pods 102, e.g., main corridors. This can permit readily testing conditions of test articles in pods 102.

In some examples, work station 1208(2) can be configured for unpacking, singulating, or otherwise preparing items 106 for further processing. Preparing can include placing items 106 in protective wrapping or containers to reduce the occurrence of damage to items 106 within warehouse 1202. Conditions of test articles can be checked using imaging system 1212 at work station 1208(2) as the items 106 are prepared. For example, the condition "this item should be wrapped in bubble wrap" can be tested against each item 106 to determine whether to expend time at work station 1208(2) to wrap or otherwise protect the item 106. In some examples using protective wrapping or containers, the condition "this item is protected correctly" can be tested to reduce the occurrence of incorrectly-prepared test articles leaving work station 1208(2).

In some examples, work station 1208(2) can be configured for packing, loading, or otherwise preparing shipments including items 106. Conditions of test articles can be checked using imaging system 1212 at work station 1208(2) before the shipments are sealed for transport or before the sealed shipments are loaded onto vessels or vehicles. For example, imaging system 1212 can be configured to look down on test articles as items 106 are being loaded into containers. This can reduce the occurrence of inventory faults such as containers including the wrong items 106, the wrong number of items 106, incorrect packing material, too-tight or too-loose packaging, or excessive vibration of items 106 within the container.

Some examples use imaging systems 1212 at work stations 1208 or imaging stations 1210 to test conditions that may not be readily apparent from non-vibrometric visual observation. For example, the center of a stack of boxes on a pallet may have missing or incorrect items that are concealed by the boxes around the outside. Testing conditions as described herein can permit detecting such inventory faults before unloading the pallet. For example, the contents or number of items in the boxes can be determined by testing conditions as described herein.

Thresholds and ranges as described herein can be set to accommodate variations in vibrational characteristics due to, e.g., the composition of the pallet (wood vs. synthetic), the tightness of wrapping of the stack of containers, the positioning of the stack on the pallet (e.g., centered, or biased towards one edge), or other variations not related to the identities or compositions of the test articles on the pallet. The same is true for containers other than pallets.

In some examples, robots 116 can represent independent, self-powered devices, such as wheeled or tracked robots or robotic carts, for example, configured to freely move about warehouse 1202. In some examples, robots 116 can represent track-guided robots configured to move containers along tracks, rails, cables, a crane system, or other guidance or support elements traversing the warehouse 1202.

In some examples, a motion system can include at least one conveyor belt or smart conveyor belt. For example, a conveyor can carry a bin or tote holding items through imaging station 1210(1). The conveyor can be stopped, or a container diverted, if an item in that container does not satisfy a condition, as determined from stripe images collected at imaging station 1210(1).

Some examples permit distinguishing between, e.g., relatively dense and relatively light items 106 inside opaque containers without opening those containers, which conventional visual inspection cannot do. In some examples, imaging systems 1212 can test conditions of test articles in motion, e.g., along a conveyor belt, without requiring the motion be stopped. This can increase factory or warehouse throughput.

Components of inventory control system 1200 may provide information to the management system 1204 regarding their current state, the state of other components of inventory control system 1200 with which they are interacting, and/or other conditions relevant to the operation of inventory control system 1200. This may allow management system 1204 to utilize feedback from the relevant components to update algorithm parameters, adjust policies, or otherwise modify its decision-making to respond to changes in operating conditions or the occurrence of particular events. In addition, while management system 1204 may be configured to manage various aspects of the operation of the components of inventory control system 1200, in particular examples, the components themselves may also be responsible for some decision-making relating to certain aspects of their operation, thereby reducing the processing load on management system 1204.

CONCLUSION

Some examples herein provide more robust identification and recognition of items inside bins, totes, packages, or other containers, using visual vibration analysis of a test article. Some examples permit locating items 106 that have been misplaced in inventory, or verifying that computer-readable records of the contents of a container correspond to the actual contents of that container. Some examples permit testing conditions of test articles that are sensitive to ionizing radiation, for which X-ray inspection is not practicable.

Some examples permit testing conditions of test articles in which some items are disarranged, occluded, or visually difficult to separate (for example, CDs stacked together). Compared to some prior schemes, vibrational analysis of consolidated images 122 as described herein can permit detecting and recognizing items 106 even when they are visually difficult to observe. Similarly, some examples are operable in any lighting condition permitting the electronic camera 108 to image a container, even if some of the items 106 in the container are in shadow or otherwise insufficiently lit for visual inspection. Some examples are robust to variations in surface albedo, texture, translucence, reflectance (e.g., specular or diffuse), or pose (e.g., orientation) of items 106.

Some example can permit detecting conditions of items 106 more subtle than presence/absence or identity, e.g., whether an item 106 is damaged, leaking, or counterfeit, or the age of an item. Differences in physical properties such as mass or center of mass, as a result of such subtle conditions, can be detected in the consolidated images 122, in some examples.

Some examples can permit determining whether a particular item is present in a view volume 114. Some examples can recognize items within a view volume 114, classify those items 106, or track those items 106 as they move. Some examples can permit performing quality inspection (e.g., count of items, structural integrity, genuineness, or age) of items 106 without having to open the item or perform manual inspection.

Although the techniques have been described in language specific to structural features and/or methodological acts, it is to be understood that the appended claims are not necessarily limited to the features and/or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, and/or a combination thereof. For example, processes described above can be embodied in, and fully automated via, software code modules executed by one or more computers and/or processors. The code modules can be embodied in any type of computer-readable medium. Some and/or all of the methods can be embodied in specialized computer hardware.

The order in which the operations are described is not intended to be construed as a limitation, and any number of the described operations can be executed in any order, and/or executed in parallel to implement the described processes. Alternative implementations are included within the scope of the examples described herein in which elements or functions may be deleted, repeated, combined in any order, subdivided into multiple sub-operations, or executed out of order from that shown or discussed, including substantially in parallel, synchronously, or in reverse order.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as, but not limited to, at least the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination thereof (e.g., a combination of XY, XZ, YZ, and/or XYZ).

Examples herein are nonlimiting unless expressly stated otherwise, regardless of whether or not they are explicitly described as being nonlimiting. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A method of verifying contents of a container, the method comprising:
    successively capturing multiple stripe images using an electronic camera operating at a frame rate of at least 60 frames per second, the electronic camera including a common capture region that images at least part of the container;
    generating a consolidated image based at least in part on the multiple stripe images;
    determining a non-image representation of the consolidated image;
    determining a reference non-image representation based at least in part on a type of the container, wherein the reference non-image representation is associated with reference contents of the container;
    comparing the non-image representation with the reference non-image representation to provide an indication of similarity; and
    determining whether contents of the container correspond to the reference contents of the container based at least in part on the indication of similarity.

2. The method of claim 1, wherein:
    the reference contents comprise a predetermined number of items; and
    the method further comprises, in response to determining that the contents of the container do not correspond to the reference contents of the container, providing an alert indicating that the container has an incorrect number of items.

3. The method of claim 1, further comprising:
    detecting entry of the container at least partly into a view volume associated with the common capture region; and
    subsequently, capturing the multiple stripe images as consecutive frames provided by the electronic camera.

4. A system, comprising:
    an electronic image sensor;
    one or more processors, at least one of which is communicatively coupled to the electronic image sensor; and
    memory coupled to the one or more processors, the memory including instructions that, when executed by the one or more processors, cause the one or more processors to perform acts comprising:
        successively capturing individual images of a plurality of images using the electronic image sensor;
        generating a consolidated image based at least in part on the plurality of images;
        determining a non-image representation of the consolidated image;
        determining whether the non-image representation satisfies a predetermined criterion; and
        providing an alert in response to the non-image representation failing to satisfy the predetermined criterion.

5. The system of claim 4, wherein:
    at least one of the one or more processors is communicatively connectable with a motion system; and
    the acts comprise, before capturing the individual images, causing the motion system to position an item at least partly within a view volume of the electronic image sensor.

6. The system of claim 4, wherein:
    the electronic image sensor comprises pixels of a common capture region and pixels outside the common capture region;
    the system comprises optics arranged with respect to the electronic image sensor to define a view volume of the common capture region; and
    the acts comprise capturing the individual images using the pixels of the common capture region.

7. The system of claim 4, further comprising a second electronic image sensor, wherein the acts comprise:
    successively capturing second individual images of a second plurality of images using the second electronic image sensor;
    generating a second consolidated image based at least in part on the second plurality of images;
    determining a second non-image representation of the second consolidated image; and
    determining whether the second non-image representation satisfies a second predetermined criterion.

8. The system of claim 4, wherein the acts comprise:
    detecting entry of a container at least partly into a view volume of the electronic image sensor; and
    subsequently, capturing the individual images.

9. The system of claim 8, further comprising an object sensor configured to detect the container in the view volume of the electronic image sensor, wherein the acts comprise detecting the entry of the container using the object sensor.

10. The system of claim 4, further comprising a visual reference object arranged at least partly within a view volume of the electronic image sensor, wherein the acts comprise:
    successively capturing a plurality of calibration images of the visual reference object using the electronic image sensor;
    determining a vibration profile associated with the electronic image sensor based at least in part on the plurality of calibration images; and
    determining whether the non-image representation satisfies the predetermined criterion further based at least in part on the vibration profile.

11. The system of claim 4, wherein:
    the electronic image sensor comprises pixels of a common capture region and pixels outside the common capture region;
    the pixels of the common capture region are arranged substantially along a primary capture axis;
    the system comprises a motorized mount retaining the electronic image sensor; and
    the acts comprise:
        determining a target orientation of a target object at least partly within a view volume of the electronic image sensor; and
        causing the motorized mount to orient the electronic image sensor based at least in part on the target orientation so that the primary capture axis is aligned either substantially parallel to or substantially transverse to the target orientation.

12. A method comprising:
   generating a consolidated image based at least in part on a plurality of successively-captured images depicting at least a portion of a test article that includes at least one container;
   determining a reference image based in part on at least one of the container or the test article;
   comparing the consolidated image with the reference image to provide an indication of similarity; and
   determining whether the consolidated image satisfies a predetermined criterion associated with a condition of the test article based at least in part on the indication of similarity.

13. The method of claim 12, further comprising:
   determining a non-image representation of the consolidated image based at least in part on a basis, wherein the basis is associated with the condition; and
   determining whether the non-image representation satisfies the predetermined criterion.

14. The method of claim 13, wherein the condition comprises a first sub-condition and a second sub-condition, the method further comprising determining the basis based at least in part on first basis data associated with the first sub-condition and second basis data associated with the second sub-condition.

15. The method of claim 13, further comprising determining the basis by performing an eigenvalue decomposition of a plurality of training images associated with the condition.

16. The method of claim 12, further comprising operating a computational model based at least in part on the consolidated image to provide data indicating whether the consolidated image satisfies the predetermined criterion, wherein the computational model is associated with a training data set comprising a plurality of training consolidated images.

17. The method of claim 16, wherein the computational model comprises at least one of a neural network, a convolutional neural network, a decision tree, a random forest, a Bayesian classifier, or a support vector machine (SVM).

18. The method of claim 12, further comprising successively capturing the individual images of the plurality of images using an electronic image sensor, wherein at least a portion of the container or of an item in the container is imaged by the electronic image sensor.

19. The method of claim 18, further comprising:
   capturing a plurality of calibration images of a visual reference object using the electronic image sensor;
   determining a vibration profile associated with the electronic image sensor based at least in part on the plurality of calibration images; and
   determining whether the consolidated image satisfies the predetermined criterion further based at least in part on the vibration profile.

20. The method of claim 12, further comprising:
   determining first region images and second region images based at least in part on the individual images, wherein the first region images correspond to a first spatial region of the individual images and the second region images correspond to a second, different spatial region of the individual images;
   generating the consolidated image based at least in part on the first region images;
   determining a second consolidated image based at least in part on the second region images; and
   determining whether the second consolidated image satisfies a second predetermined criterion associated with the condition.

* * * * *